United States Patent
Ivanov

(10) Patent No.: US 9,959,497 B1
(45) Date of Patent: May 1, 2018

(54) SYSTEM AND METHOD FOR USING A DIGITAL VIRTUAL CLONE AS AN INPUT IN A SIMULATED ENVIRONMENT

(71) Applicant: Yevgen Ivanov, Edmonton (CA)

(72) Inventor: Yevgen Ivanov, Edmonton (CA)

(73) Assignee: Yevgen Ivanov, Edmonton (CA)

( * ) Notice: Subject to any disclaimer, the term of this patent is extended or adjusted under 35 U.S.C. 154(b) by 0 days. days.

(21) Appl. No.: 15/419,889

(22) Filed: Jan. 30, 2017

(51) Int. Cl.
G06N 3/00 (2006.01)

(52) U.S. Cl.
CPC ..................... G06N 3/006 (2013.01)

(58) Field of Classification Search
CPC ....................................................... G06N 3/006
See application file for complete search history.

(56) References Cited

U.S. PATENT DOCUMENTS

| | | | |
|---|---|---|---|
| 2006/0143569 A1* | 6/2006 | Kinsella ............... | G06Q 10/107 715/752 |
| 2007/0167204 A1* | 7/2007 | Lyle ....................... | A63F 13/12 463/9 |
| 2008/0201227 A1 | 8/2008 | Bakewall et al. | |
| 2008/0316227 A1* | 12/2008 | Fleury ................. | G06F 3/04847 345/630 |
| 2009/0254417 A1* | 10/2009 | Beilby ................... | G06N 3/004 706/45 |
| 2010/0199193 A1* | 8/2010 | Hamilton, II .......... | A63F 13/10 715/757 |
| 2015/0127486 A1 | 5/2015 | Advani | |

* cited by examiner

*Primary Examiner* — Maurice L. McDowell, Jr.
(74) *Attorney, Agent, or Firm* — Bay Area Intellectual Property Group, LLC

(57) ABSTRACT

A system and a method includes a first computing system interacting with a user and at least capturing physical and mental attributes of the user. The first computing system processes, formats, and organizes captured information of the user to provide organized user information. The first computing system designs a virtual clone of the user using the organized user information and produces a digital virtual clone of the user. A storage device stores the organized user information. A second computing system generates and displays a simulated environment. The second computing system transfers the organized user information, integrates the organized user information, and displays the digital virtual clone of the user in the simulated environment, wherein the digital virtual clone interacts with the stimulated environment.

21 Claims, 11 Drawing Sheets

SYSTEM AND METHOD FOR USING A DIGITAL VIRTUAL CLONE AS AN INPUT IN A SIMULATED ENVIRONMENT

CROSS-REFERENCE TO RELATED APPLICATIONS

Not applicable.

RELATED CO-PENDING U.S. PATENT APPLICATIONS

Not applicable.

INCORPORATION BY REFERENCE OF SEQUENCE LISTING PROVIDED AS ATEXT FILE

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

One or more embodiments of the invention generally relate to a digital virtual clone of a user that learns about user and effectively functions on the behalf of the user. More particularly, certain embodiments of the invention relate to creation of the user's digital virtual clone using a designated computer program and using the digital virtual clone as an input in a simulated environment created using a designated computer program.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Virtual cloning of human beings is being explored for various purposes in the industry. The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon.

By way of educational background, another aspect of the prior art generally useful to be aware of is that virtual clones may be enabled to experience simulations to gather enough information to make a choice like deciding a method for medical diagnostics, virtual tours for making travel decisions, virtual cloning of famous personalities to be used in simulations, virtual clones for acting as your stand-in, etc. . . . a travel itinerary, selecting a real estate property, entertainment industry etc. . . . For example, the evolution of technology has allowed gaming to be an increasingly immersive activity. Yet a gamer's success still depends on a constant set of variables, such as visual attention, response speed, situation evaluation, and decision making. Typically, modern gamers play in "third person," just controlling the virtual character on the screen. The traditional gamer doesn't bother with human emotions, such as, fear that may potentially restrict the virtual character's behavior in certain circumstances. For a traditional gamer the virtual character he/she has been controlling may have very little or nothing in common with him/her. Further the traditional virtual character may not have any real intelligence at the core to have a dynamic evolving interaction in a given application.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 7A is a flow chart illustrating an exemplary process for using a digital virtual clone of a user in a predesigned simulation, in accordance with an embodiment of the present invention;

FIG. 8A is a flow chart illustrating an exemplary process for using a digital virtual clone of a user in a predesigned simulation, in accordance with an embodiment of the present invention;

Figure 1:
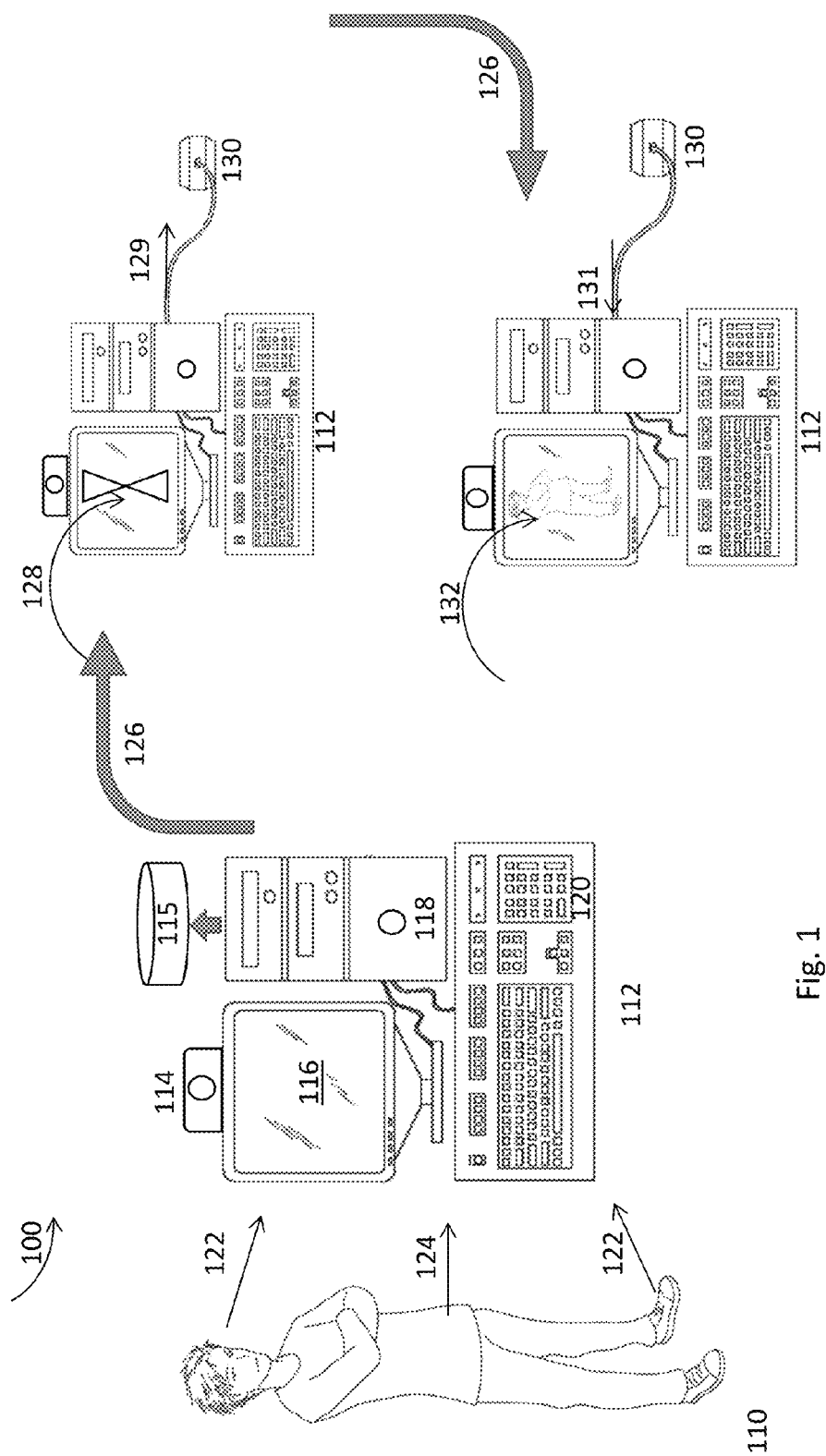
FIG. 1 illustrates an exemplary system for providing a digital virtual clone of a user, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settle law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognize in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" includes the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. .sctn.112, sixth paragraph, for that mechanism/unit/circuit/component. "Configured to" may also include adapting a manufacturing process to fabricate devices or components that are adapted to implement or perform one or more tasks "Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" and "consisting of" limits the scope of a claim to the specified elements or method steps, plus those that do not materially affect the basis and novel characteristic(s) of the claimed subject matter (see Norian Corp. v Stryker Corp., 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, removable media, flash memory, a "memory stick", any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, Firefox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Additionally, the phrase "configured to" or "operable for" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; the non-transitory computer readable medium, however, does not include a pure transitory signal per se; i.e., where the medium itself is transitory.

Herein, the term or terms virtual clone, virtual twin, virtual double, virtual character, digital clone, digital twin, digital double, virtual simulation, and virtual existence may be used to indicate the digital virtual clone of a user. The digital virtual clone of a user may include a computer program comprising a three-dimensional, computer generated clone of a user. The digital virtual clone may be introduced in a virtual reality environment. The digital virtual clone may become a part of the virtual reality environment or is immersed within the environment and whilst there, is able to manipulate objects or perform a series of actions.

FIG. 1 illustrates an exemplary system for providing a digital virtual clone of a user, in accordance with an embodiment of the present invention. A system 100 comprises at least a user 110, at least a computing system 112, and at least a storage device 130. The computing system 112 includes, but not limited to, a display screen 116, a visual input device 114, a voice input device 118, a database 115, and a miscellaneous data input interface 120.

During a typical operation of the system 100 the visual input device 114 is used to capture a user's physical attributes. The physical attributes (appearance) include, but are not limited to, the user's picture (facial scanning), filming user's actions, and recording user's voice. In some embodiments, the physical attributes may be gathered by the computing system 112 in a direct interaction with the user. In some embodiments, the physical attributes may be gathered by the computing system 112 from another device that may have previously gathered and archived the physical attributes of the user. The other device (not shown in figure) may include, but not limited to, a computing system similar to or different from that of the computing system 112. The voice input device 118 may record the voice of the user. The miscellaneous data input interface 120 may interact with the user to gather information on the user's personality. The information on the user's personality may be stored in the database 115. The computing system 112 may then process 126 and format 128 the visual input, voice input, and the gathered information and organize the user's individual information. The user's organized individual information i.e., user's digital memory, may then be transmitted 129 to the storage device 130 by the computing system 112. The storage device 130 (having a plugin software) when connected 131 to the computing system 112 having a designated compatible application software renders the user's organized individual information in the form of a digital virtual clone 132 of the user.

In some embodiments, the user's organized individual information saved on the storage device may be in the form of a plugin software with the user's individual information organized in a particular manner. The plugin software in conjunction with a designated compatible application software may be enabled to render a digital virtual clone of the user resulting in the birth of the user's digital virtual clone. The compatible application software in the plugin may begin transferring the clone's information to the new digital environment when the software device is connected to a second computing system. A compatible application software in the second computing system may be enabled in making necessary adjustments depending on the user's individual information. The digital virtual clone may be designed to bear a resemblance to the user's appearance and personality as well as the user's mental and physical states. In other words, the user may be an exclusive proprietor of the information of his/her recorded digital virtual clone which information may be rendered as a digital virtual clone as identically to the user as modern technology may permit.

It may be appreciated by a person with ordinary skill in the art, in light of and in accordance with the teachings of the present invention, the computing system 112 may include virtually any computer device capable of capturing, processing, and displaying the physical and mental attributes of the user 110. Non-limiting examples of the computing system 112 include a computer, and a smart phone. The computing system 112 may include any computing platform that executes computer software and/or code from a non-transitory computer readable medium. The computing system 112 may include a single device or multiple devices. In embodiments where the computing device 112 is a single device all the functions, without limitation, of capturing the video, capturing the audio, capturing mental attributes, processing, and formatting gathered information, organizing the user's information, transmitting the user's organized information to a storage device and rendering the digital virtual clone, may be executed by the single computer system 112. In some embodiments where the computing system 112 includes multiple devices these functions may be distributed between the multiple devices. In a non-limiting example, the gathering, processing, formatting, organization of information, and transmitting the organized information to a storage device may be done by one computing system and the rendering of the digital virtual clone may be executed by a second device. In other embodiments, the computing system 112 is a single device.

It may be appreciated by a person with ordinary skill in the art, in light of and in accordance with the teachings of the present invention, that the computing system 112 may connect to any number of devices with virtually any wired and/or wireless means. The computing system may connect to virtually any device by means such as, but not limited to, Bluetooth connection, Ethernet cable, USB cable, WIFI, IRDA, etc. In some embodiments, the computing system 112 may connect to other devices for gathering physical or mental attributes of the user. In other embodiments, the computing system 112 may connect to other devices for transmitting the digital virtual clone of the user.

It may be appreciated by a person with ordinary skill in the art, in light of and in accordance with the teachings of the present invention, that the visual input device 114 may be any device capable of capturing an image 122 of the user 110. Visual input device 114 may include devices such as, but not limited to, digital cameras, web cameras, video cameras, etc. In other embodiments of the present invention, visual input device 114 may be an integrated web camera on a personal computer, tablet or laptop.

It may be appreciated by a person with ordinary skill in the art, in light of and in accordance with the teachings of the present invention, that the voice input device 118 may be any device capable of capturing the user's voice 124. Voice input device 118 may include devices such as, but not limited to, digital cameras, web cameras, video cameras, voice recorders, etc. In other embodiments of the present invention, voice input device 118 may be an integrated voice recorder on a personal computer, tablet or laptop.

It may be appreciated by a person with ordinary skill in the art, in light of and in accordance with the teachings of the present invention, a miscellaneous data input interface 120 may be virtually any data input interface capable of capturing the user's mental attributes. The computing system 112 may include tools, for example, but not limited to, questionnaires which the user answers using the miscellaneous data input interface 120. In some alternate embodiments, the voice input device 118 may be utilized for capturing the user's mental attributes. The tools may be capable of gathering information on the user's preferences, temper, and various other mental and physical states. Non-limiting variables of the mental state include human feelings and features, such as curiosity, kindness, ambition, patience, fear, envy, anger, arrogance, etc. The tools may also capture the user's physical state i.e., physical strength and weakness. The user may be enabled to manipulate the tools to reflect or project multiple physical and mental states. In a non-limiting example, users may alter settings so that they may learn how they'd behave if some of their traits were different from their realistic physical and emotional benchmark. This information may also be employed by the designated compatible application software in the computing system 112 while designing and rendering the digital virtual clone of the user. The database 115 may be, but not limited to, a plurality of data servers, and a memory card. It may be appreciated by a person with ordinary skill in the art, in light of and in accordance with the teachings of the present invention, that the database (containing user's organized information) may contain virtually any user data to adapt the functionality of the digital virtual clone based on the simulated environment. In other embodiments, the user data may be stored in a memory card in the computing system 112.

It may be appreciated by a person with ordinary skill in the art, in light of and in accordance with the teachings of the present invention, the organized user information gathered may partially or completely be contained in a local computing platform and/or network. In an alternative embodiment of the present invention, the organized user information gathered may be located on a local computer network. In other alternate embodiments, the organized user information gathered may be located on a remote computer network such as, but not limited to a cloud network.

It may be appreciated by a person with ordinary skill in the art, in light of and in accordance with the teachings of the present invention, the storage device may include any portable storage device or the storage device may be internet based. Non-limiting examples of portable storage media include computer readable devices like USB, DVD, etc. Non-limiting examples of internet based storage media include cloud drive, data download web link, etc. The organized user information used for designing the digital virtual clone of the user may be stored in a local computing platform and/or network. In an alternative embodiment of the present invention, the user information gathered may be located on a local computer network.

Figure 2:
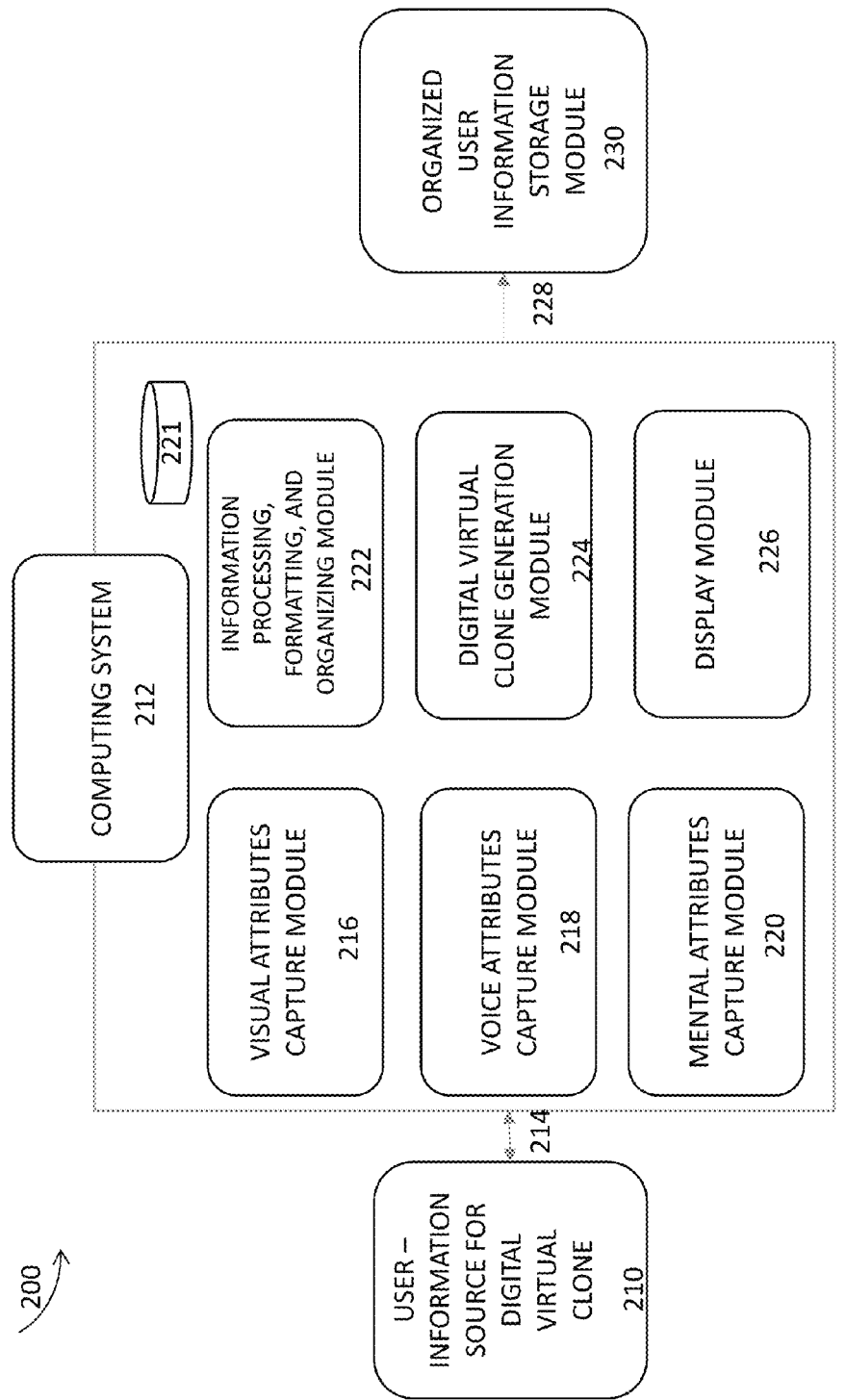
FIG. 2 illustrates an architecture of an exemplary system for providing a digital virtual clone of a user, in accordance with an embodiment of the present invention.

FIG. 2 illustrates an architecture of an exemplary system for providing a digital virtual clone of a user, in accordance with an embodiment of the present invention. An architecture 200 may comprise a computing system 212. The computing system 212 may include a visual attributes capture module 216, a voice attributes capture module 218, a mental attributes capture module 220, a database module 221, an information processing, formatting, and organizing module 222, a digital virtual clone generation module 224, a display module 226, an interface module 228, and an organized user information storage module 230. The visual attributes capture module 216, may have a means of capturing an image (still and moving image), such as, without limitation, a camera 114 or virtually any camera, of a user 210. The voice attributes capture module 218, may have a means of capturing the voice, such as, without limitation, a voice recorder 118 or virtually any voice recorder, of a user 210. The mental attributes capture module 220, may have a means of capturing the mental attributes, such as, without limitation, gathers information using display of questions on the display module 226 which the user answers using miscellaneous data capture device 120, or gathers information using the speaker—recorder 118 where the user listens and answers to a series of questions, etc. Information processing, formatting, and organizing module 222 may have a means of processing an image, a voice, and the gathered information, such as, without limitation, a processing unit, a computer, or a server to execute computer code and/or algorithms from a non-transitory computer readable medium for image recognition. Digital virtual clone generation module 224 may have a processing means such as, without limitation, a processing unit, a computer, or a server to execute computer code and/or algorithms from a non-transitory computer readable medium for designing a digital virtual clone of the user. Both information processing, formatting, and organizing module 222 and the digital virtual clone generation module 224 may access one or more databases 221 as part of executing computer code and/or algorithms to, respectively, recognize an image, a voice, or the gathered information in the process of designing the digital virtual clone. A display module 226 may have a means to display the digital virtual clone, such as, without limitation, a screen 116 on a computing system 212, to a user. Interface module 228 may have a processing means such as, without limitation, a processing unit, a computer, or a server to execute computer code and/or algorithms from a non-transitory computer readable medium for transmitting organized user information to an organized user information storage module 230. Organized user information storage module 230 may have a processing means such as, without limitation, a processing unit, a computer, or a server to execute computer code and/or algorithms from a non-transitory computer readable medium for receiving, storing, and transmitting the organized information of the user to the digital virtual clone generation module 224. In some embodiments, the digital virtual clone generation module 224 may be included in a computing system physically different from the computing system 212 but having similar features and means like the computing system 212.

It may be appreciated by a person with ordinary skill in the art, in light of and in accordance with the teachings of the present invention, that one or more modules may be embodied in a single device. In alternative embodiments of the present invention, all modules except the organized user information storage module may be embodied in a personal computer or laptop device. The personal computer or laptop device would be capable of gathering information on the physical and mental state of a user, processing, formatting, and organizing the information, designing and displaying a digital virtual clone of the user, and enabling the user to transmit the organized user information to a storage device. In some embodiments, the personal computer or laptop device may enable the user to tailor the attributes of the organized user information that will then be used to design the digital virtual clone.

It may be appreciated by a person with ordinary skill in the art, in light of and in accordance with the teachings of the present invention, that virtually any algorithm and/or computer code may be used to recognize and capture a visual on the visual attributes capture module 216 and the information processing, formatting, and organizing module 222. Visual recognition algorithms and/or methods may include, without limitation, Bayesian networks, fuzzy logic, neural networks, template matching, Hidden Markov models, machine learning, data mining, feature extraction and data analysis/statistics, optical character recognition, etc. In an alternative embodiment of the present invention, a binary search tree may be implemented to extract data from a visual.

It may be appreciated by a person with ordinary skill in the art, in light of and in accordance with the teachings of the present invention, that virtually any algorithm and/or computer code may be used to recognize and capture a sound/voice on the voice attributes capture module 218 and the information processing, formatting, and organizing module 222. Voice recognition algorithms and/or methods may include, without limitation, Bayesian networks, fuzzy logic, neural networks, template matching, Hidden Markov models, machine learning, data mining, feature extraction and data analysis/statistics, optical character recognition, etc. In an alternative embodiment of the present invention, a binary search tree may be implemented to extract data from a voice.

It may be appreciated by a person with ordinary skill in the art, in light of and in accordance with the teachings of the present invention, that virtually any algorithm and/or computer code may be used to recognize and capture mental and physical state of a user on the mental attributes capture module 220 and the information processing, formatting, and organizing module 222. Mental state analysis recognition algorithms and/or methods may include, without limitation online, web-based or physically transmitted programs that administer the questionnaire regarding mental and/or physical attributes.

It may be appreciated by a person with ordinary skill in the art, in light of and in accordance with the teachings of the present invention, that there may be a plurality of the same modules in architecture 200. A plurality of modules such as, without limitation, a visual attributes capture module 216, a voice attributes capture module 218, a mental attributes capture module 220, an information processing, formatting, and organizing module 222, a digital virtual clone generation module 224, a display module 226, an interface module 228, and an organized user information storage module 230 may be present in architecture 200. The plurality of similar modules may work in parallel or independently to improve the throughput and/or speed of architecture 200. In alternative embodiments of the present invention, a plurality of capture, processing, formatting, and organizing, generation, display, interface, and storage modules may be connected to a system via wired and wireless connections to access resources from different wired and wireless networks. In still other alternative embodiments of the present invention, a plurality of similar modules may form a secondary system capable of seamlessly substituting an errant module.

It may be appreciated by a person with ordinary skill in the art, in light of and in accordance with the teachings of the present invention, that one or more modules may transmit capture information to a tech support server that is on an accessible network or over the internet. In alternative embodiments of the present invention, additional captured information may be sent to a server to alleviate processing load on a system, in a non-limiting example, if multiple variations of the digital virtual clone are being simultaneously generated.

It may be appreciated by a person with ordinary skill in the art, in light of and in accordance with the teachings of the present invention, that any module in architecture 200 may perform data manipulation. Data manipulation such as, but not limited to, compression, encryption, formatting. In alternative embodiments of the present invention, any module sending data may first compress the data prior to data transmission.

Figure 3:
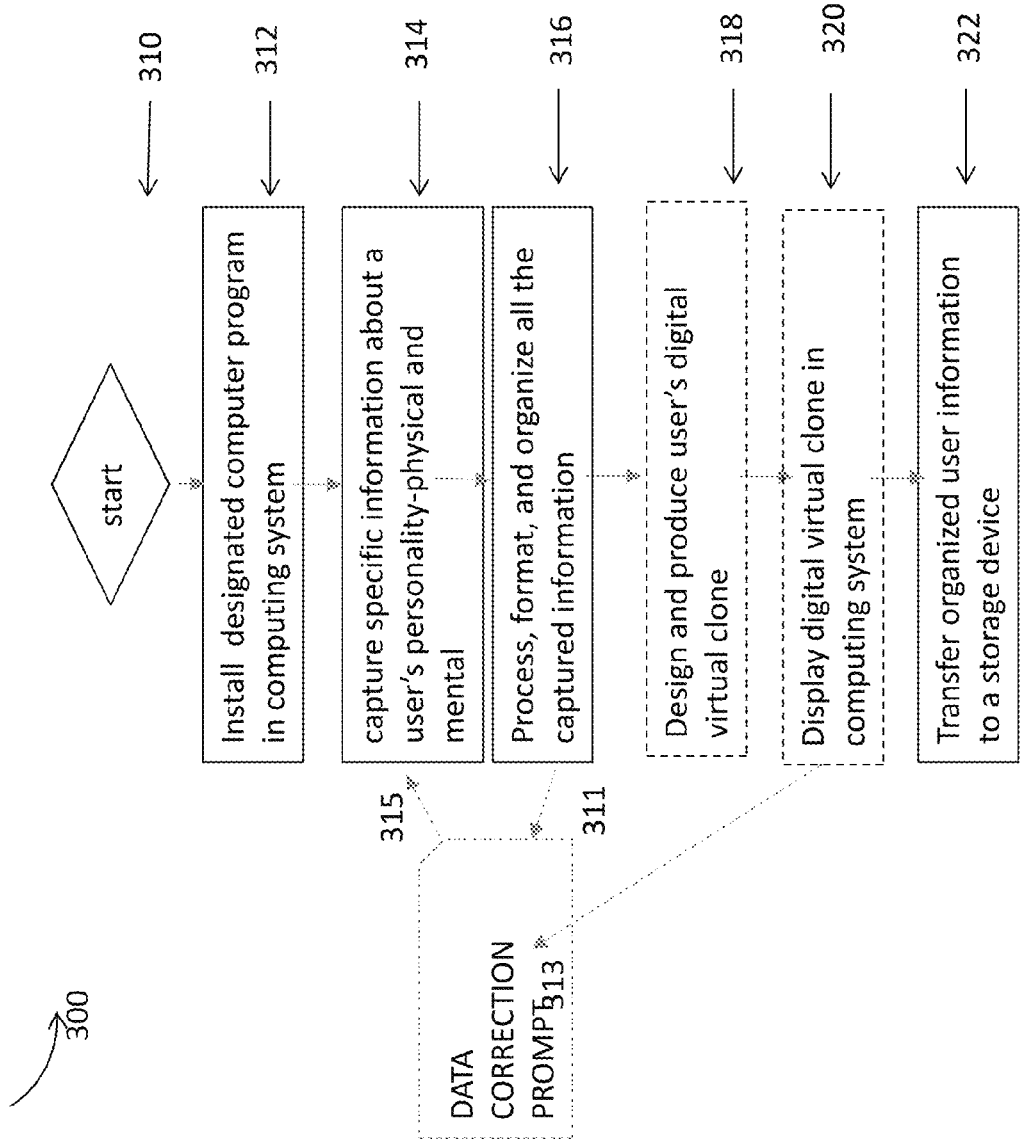
FIG. 3 is a flow chart illustrating an exemplary process for providing a digital virtual clone of a user, in accordance with an embodiment of the present invention.

FIG. 3 is a flow chart illustrating an exemplary process for providing an organized user information of a user, in accordance with an embodiment of the present invention. An organized user information rendering process 300 begins with a start step 310. A designated computer program may be installed in a computing system in a step 312. The computing system in step 312 may be configured for capturing specific information about a user's personality including information on physical and mental state of a user in a step 314. Image/voice/data processing, formatting and rendering algorithms may be applied in a process, format, and organize all the captured information in a step 316. In some embodiments, the processing and formatting may be separate actions. In other embodiments, the actions may be combined. A digital virtual clone of the user may be designed in a step 318 using organized user information from step 316. If the digital virtual clone was not determined, the user may be prompted 313 to capture 313 correct data 315. Steps 314, 311, 313, 315 and 316 may be repeated until the captured, processed, formatted and rendered information is sufficient to provide a satisfactory digital virtual clone of the user in step 318. The digital virtual clone may then be displayed in the computer system in a step 320. In some embodiments, step 320 may be optional. The organized user information of the user may then be sent to a storage device in a transfer organized user information to a storage device step 320. In certain embodiments if the displayed digital virtual clone is not satisfactory steps 314, 311, 313, 315, 316, and 318 may be repeated.

It may be appreciated by a person with ordinary skill in the art, in light of and in accordance with the teachings of the present invention, that virtually any additional steps may be added to the organized user information rendering process 300. Additional steps may include, but not limited to, additional data gathering, sending messages to other devices, and accessing additional resources. In yet another alternative embodiment of the present invention, the organized user information rendering process 300 may include suggesting recommended resolutions to a user before and/or after the designated computer program captures user information.

It may be appreciated by a person with ordinary skill in the art, in light of and in accordance with the teachings of the present invention, that one or more steps in the organized user information rendering process 300 may be added, removed, or rearranged. In other embodiments of the present invention, the order of steps in the organized user information rendering process 300 may occur in any order. In still other embodiments of the present invention, additional steps may be added to the organized user information rendering process 300.

Figure 4:
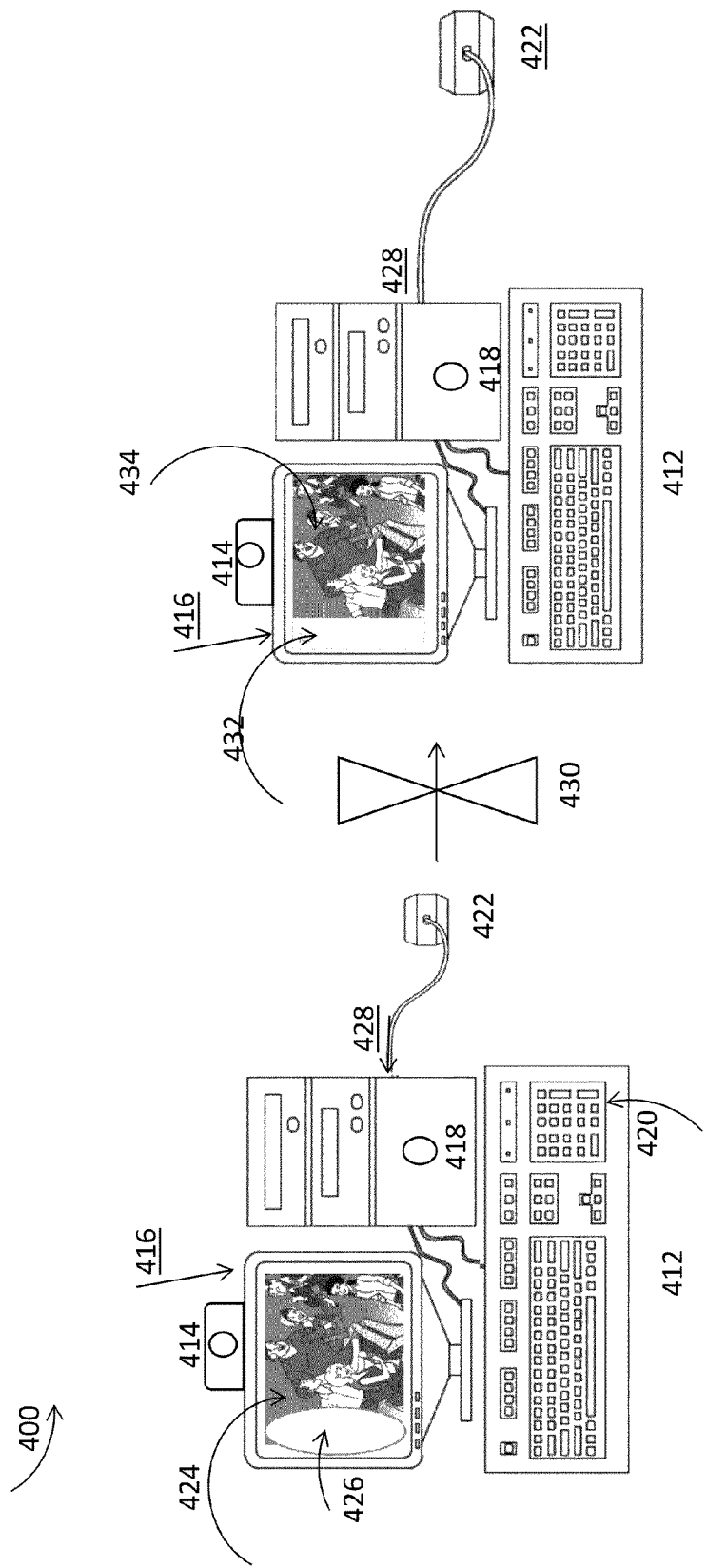
FIG. 4 illustrates an exemplary system using a digital virtual clone of a user in a predesigned simulation, in accordance with an embodiment of the present invention.

FIG. 4 illustrates an exemplary system using a digital virtual clone of a user in a predesigned simulation (at times referred to as simulation environment), in accordance with an embodiment of the present invention. A system 400 comprises at least a user (not shown in figure), at least a computing system 412, and at least a storage device 422. The computing system 412 includes a display screen 416, a visual input device 414, a voice input device 418, and a miscellaneous data input interface 420.

During a typical operation of the system 400, a designated computer program is installed in the computing system 412. The computing system 412 is configured to execute a simulated environment 424 using the designated computer program. It may be appreciated by a person with ordinary skill in the art, in light of and in accordance with the teachings of the present invention that the simulated environment may include, but not be limited to a film, a game, a social scenario, etc. In one non-limiting example, as shown in FIG. 4, is presented a scene with various characters 424 as displayed in the display screen 416. The simulated environment executed by the computer program is programmed to have a vacant spot 426 for incorporating an additional character. The user may connect 428 the storage device 422 to the computing system 412. The storage device includes organized user information of the user (in the form a plugin or designated computer program). The storage device 422 may be configured to transfer the organized user information of the user to the computing system 412. The designated computer program in the computing system 412 may be configured to receive and process 430 the organized user information of the user and fill/replace the vacant spot 426 with a digital virtual clone 432. The simulated environment 424 may now be transformed to a new environment 434 that now includes the digital virtual clone 432 of the user as an interactive character in the simulation.

It may be appreciated by a person with ordinary skill in the art, in light of and in accordance with the teachings of the present invention, the computer program may include any software algorithm capable of creating a vacant spot in the simulation and capable of incorporating the organized user information in the form of the digital virtual clone of the user in the vacant spot.

It may be appreciated by a person with ordinary skill in the art, in light of and in accordance with the teachings of the present invention, the computing system 412 may include virtually any computer device capable of running the simulated environment 424, receiving 428 the organized user information from the storage device 422, seamlessly incorporating the digital virtual clone 432 in the modified simulated environment 434 and displaying the modified simulated environment 434 in the display system 416. Non-limiting examples of the computing system 412 include a computer, and a smart phone. The computing system 412 may include any computing platform (computer program/algorithm) that executes computer software and/or code from a non-transitory computer readable medium. The computing device 412 may include a single device or multiple devices. In embodiments where the computing device 412 is a single device all the functions of receiving, incorporating and displaying the digital virtual clone in a simulated environment may be executed by the single computer system 412. In embodiments where the computing system 412 includes multiple devices these functions may be distributed between the multiple devices. In a non-limiting example, the receiving organized user information and incorporating the digital virtual clone may be done by one computing system and the displaying of the digital virtual clone in the display system may be executed by a second computing system. In other embodiments, the computing system 412 is a single device.

It may be appreciated by a person with ordinary skill in the art, in light of and in accordance with the teachings of the present invention, computing system 412 may connect to any number of devices with virtually any wired and/or wireless means. The computing system may connect to virtually any device by means such as, but not limited to, Bluetooth connection, Ethernet cable, USB cable, WIFI, IRDA, etc. In some embodiments, the computing system 412 may connect to other devices for receiving the organized user information of the user. In other embodiments, the computing system may connect to other devices for incorporating and displaying the digital virtual clone of the user in a simulated environment. In regards to the privacy of the user's information, the users' data, regardless of the means of transmission, may be encrypted.

It may be appreciated by a person with ordinary skill in the art, in light of and in accordance with the teachings of the present invention, visual input device 414 may be any device capable of capturing an image of the user. Visual input device 414 may include devices such as, but not limited to, digital cameras, web cameras, video cameras, etc. In other embodiments of the present invention, visual input device 414 may be an integrated web camera on a personal computer, tablet or laptop.

It may be appreciated by a person with ordinary skill in the art, in light of and in accordance with the teachings of the present invention, voice input device 418 may be any device capable of capturing the user's voice. Voice input device 418 may include devices such as, but not limited to, digital cameras, web cameras, video cameras, voice recorders, etc. In other embodiments of the present invention, voice input device 418 may be an integrated voice recorder on a personal computer, tablet or laptop.

It may be appreciated by a person with ordinary skill in the art, in light of and in accordance with the teachings of the present invention, a miscellaneous data input interface 420 may be virtually any data input interface capable of capturing the user's mental attributes. The computing system 412 may include tools, for example, but not limited to, questionnaires which the user answers using the miscellaneous data input interface 420. The tools may be capable of gathering information on the user's preferences, temper, and various other mental and physical states.

It may be appreciated by a person with ordinary skill in the art, in light of and in accordance with the teachings of the present invention, the user information and gathered and the simulated environment may partially or completely be contained in a local computing platform and/or network. In an alternative embodiment of the present invention, the user information gathered and the simulated environment may be located on a local computer network.

It may be appreciated by a person with ordinary skill in the art, in light of and in accordance with the teachings of the present invention, the storage device may include any portable storage device or the storage device may be internet based. Non-limiting examples of portable storage media include computer readable devices like USB, DVD, etc. Non-limiting examples of internet based storage media include cloud drive, data download link, etc. In some embodiments, the storage device 422 may only include the digital virtual clone of the user. In some embodiments, the storage device 422 may also contain the simulated environment with or without the incorporation of the digital virtual clone of the user.

It may be appreciated by a person with ordinary skill in the art, in light of and in accordance with the teachings of the present invention, that once the computer program including the simulated environment, such as, but not limited to, a animated film software, is installed to a user's personal computer, the user may be encouraged to connect the storage device containing his/her own digital virtual clone. The film software may be configured to read and analyze the information on the digital virtual clone's character and may proceed to transfer the client's clone into the existing animated film software. The film software may include a vacant character spot. The user's digital virtual clone may be digitally incorporated into the movie's vacant character's spot. In some embodiments, the user may be able to choose a film character from a movie description. In a non-limiting example, the movie software with multiple vacant characters' spots may provide a choice for the user to pick the character. Template movies may be available for this kind of entertainment.

In some embodiments, it may take some time for the movie software to generate and execute algorithms needed for the new character's behavior to be integrated into an existing movie plot. The newly introduced character's acting pattern may strictly originate from and may be strongly dependent on the user's unique personal data as provided by the data on the digital virtual clone. Accordingly the user's digital virtual clone may be implanted into the existing movie plot. In a response to the various situations dictated by the film plot, the user's digital virtual clone may simulate some possible behavioral scenarios reflecting the user's real life personality. The film software may analyze, match, modify and render episodes to stream the movie. In some embodiments the final movie, affected by the invasion of a new character, may differ considerably from the original movie.

In a non-limiting example, during a typical operation of the system 400, a designated computer program is installed in the computing system 412. The computer program may include software algorithms for a feature film plot. The feature film plot may have empty spots for the new extra characters (digital virtual clone of the user). The software algorithm may be designed to fill character spots in the film/movie software. After filling the spots the movie software may try to analyze the organized user information containing the user's personal data and then proceed to adapt the movie plot accordingly to fit the features of the new character i.e., the user. However, the software may attempt to retain the initial scenario of the film while attempting to make some deviations determined by the features of the user's digital virtual clone. For example, in the film plot, similar to the famous movie "Lost", the new character may be asked to carry out certain duties, like hunting animals to provide food for all people in the movie scene. However, it may be possible that the user whose organized information is used in the designing the digital virtual clone in the plot for filling the vacant spots may be against killing animals. This may annul an opportunity for the user's clone to chase a deer in the forest. The designated computer program may adapt the film's story line to enable the digital virtual clone of the user to enable the user for example, but not limited to, to be able to make pots and bowls from clay. So, both the film plot and the behavior of the digital virtual clone may be changed by the designated software. However, the digital virtual clone of the user may not be supposed to be adapting to the new environment. The digital virtual clone may continue mirroring the user's individuality in any circumstance, while the film plot may be flexible enough to accommodate that character, and, at the same time, not venture very far from the original plot. The designated computer program including software algorithm for the film may be responsible for matching the two software algorithms i.e., the designated computer program including the organized user information and the designated computer program including the software algorithm for the film.

In some embodiments, the designated computer program that provides the organized user information for creating the digital virtual clone may have to offer as many as possible questions from different fields to cover as many permutations and combinations of situations generally possible. In some embodiments, where the digital virtual clone may be introduced in a non-pre-set situation in a simulation the designated software may in some embodiments attempt to modify the characteristics of the digital virtual clone of the user (dictated by the organized user information) to suit the non-pre-set simulation. In other embodiments, the software program may attempt to modify the simulation to suit the original characteristics of the user. Both these embodiments may be achieved by the software by summarizing the user's information using analytical algorithms to pick up the most probable response of the user to the pre-set situation. A user may be surprised at the outcome as he/she may themselves not be able to predict their reactions in a particular simulation environment.

Figure 5:
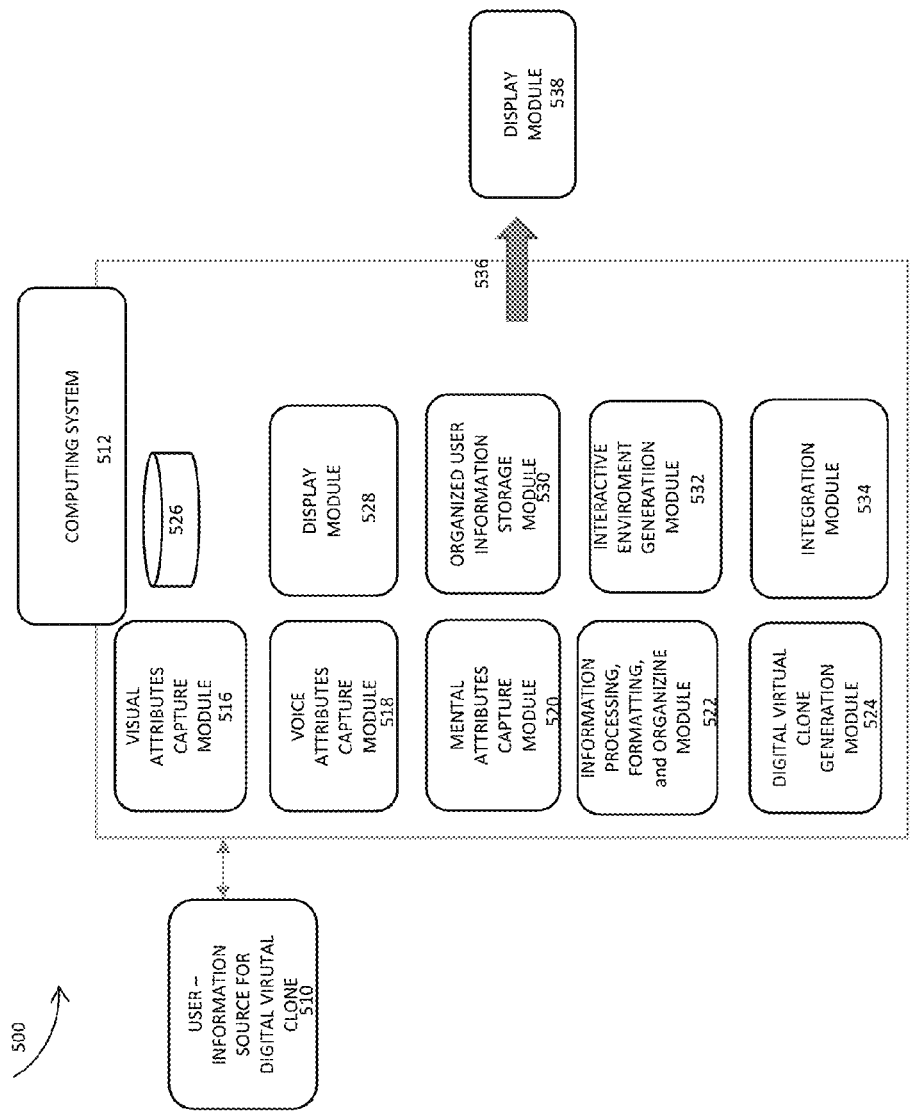
FIG. 5 illustrates an architecture of an exemplary system for providing a digital virtual clone of a user, in accordance with an embodiment of the present invention.

FIG. 5 illustrates an architecture of an exemplary system for providing a digital virtual clone of a user, in accordance with an embodiment of the present invention. An architecture 500 may include a computing system 512 and a user 510 (source for digital virtual clone). The computing system 512 may include a visual attributes capture module 516, a voice attributes capture module 518, a mental attributes capture module 520, an information processing, formatting, and organizing module 522, a digital virtual clone generation module 524, a database 526, a display module 528, an organized user information storage module 530, an interactive simulated environment generation module 532, an integration module 534, an interface module 536, and a display of digital virtual clone in simulated environment module 538. The visual attributes capture module 516, may have a means of capturing an image (still and moving image), such as, without limitation, a camera 414 or virtually any camera, of a user 510. The voice attributes capture module 518, may have a means of capturing the voice, such as, without limitation, a voice recorder 418 or virtually any voice recorder, of a user 510. The mental attributes capture module 520, may have a means of capturing the mental attributes, such as, without limitation, gathers information using display of questions on the display module 528 which the user answers using miscellaneous data capture device 420, or gathers information using the speaker—recorder 418 where the user listens and answers to a series of questions, etc. Information processing, formatting, and organizing module 522 may have a means of processing an image, a voice, and the gathered information, such as, without limitation, a processing unit, a computer, or a server to execute computer code and/or algorithms from a non-transitory computer readable medium for image recognition. Digital virtual clone generation module 524 may have a processing means such as, without limitation, a processing unit, a computer, or a server to execute computer code and/or algorithms from a non-transitory computer readable medium for designing a digital virtual clone of the user. Both information processing, formatting, and organizing module 522 and the digital virtual clone generation module 524 may access one or more databases (not shown in figure) as part of executing computer code and/or algorithms to, respectively, recognize an image, a voice, or the gathered information in the process of designing the digital virtual clone. A database 526 may have a means to store the information gathered on the user. A display module 524 may have a means to display the digital virtual clone, such as, without limitation, a screen 416 on a computing system 512, to a user. Organized user information storage module 530 may have a processing means such as, without limitation, a processing unit, a computer, or a server to execute computer code and/or algorithms from a non-transitory computer readable medium for receiving, storing, and transmitting a digital virtual clone of the user. In some embodiments, the database 526 and the organized user information storage module 530 may be the same module. In some other embodiments, the database 526 and the organized user information storage module 530 may be independent modules. Interactive environment generation module 532 may have a processing means such as, without limitation, a processing unit, a computer, or a server to execute computer code and/or algorithms from a non-transitory computer readable medium for creating or modifying a simulated environment installed in the computing system 512. Integration module 534 may have a processing means such as, without limitation, a processing unit, a computer, or a server to execute computer code and/or algorithms from a non-transitory computer readable medium for integrating the digital virtual clone with the simulated environment to create a modified simulated environment that may be affected and that may affect the characteristics/features of the digital virtual clone of the user. Interface module 536 may have a processing means such as, without limitation, a processing unit, a computer, or a server to execute computer code and/or algorithms from a non-transitory computer readable medium for transmitting a modified simulated environment including the digital virtual clone to the display module 538. The display 538 may have a processing means such as, without limitation, a processing unit, a computer, or a server to execute computer code and/or algorithms from a non-transitory computer readable medium for displaying of the digital virtual clone in a simulated environment. In some embodiments, the display module 528 may be used as the display module 538. In alternative embodiments, the display modules 528 and 538 may be independent.

It may be appreciated by a person with ordinary skill in the art, in light of and in accordance with the teachings of the present invention, that one or more modules may be embodied in a single device. In alternative embodiments of the present invention, all modules except the organized user information storage module 530 and the display module 538 may be embodied in a personal computer or laptop device which may be capable of gathering information on the physical and mental state of a user, processing, formatting, and organizing the information, designing and displaying a digital virtual clone of the user, and enabling the user to transmit the organized user information to a storage device. In some embodiments, the personal computer or laptop device may enable the user to tailor the attributes of the digital virtual clone (i.e., alter the information on the user) based on the simulated environment.

It may be appreciated by a person with ordinary skill in the art, in light of and in accordance with the teachings of the present invention, that virtually any algorithm and/or computer code may be used to recognize and capture a visual on the visual attributes capture module 516 and the information processing, formatting, and organizing module 522. Visual recognition algorithms and/or methods may include, without limitation, Bayesian networks, fuzzy logic, neural networks, template matching, Hidden Markov models, machine learning, data mining, feature extraction and data analysis/statistics, optical character recognition, etc. In some alternative embodiments of the present invention, a binary search tree may be implemented to extract data from a visual.

It may be appreciated by a person with ordinary skill in the art, in light of and in accordance with the teachings of the present invention, that virtually any algorithm and/or computer code may be used to recognize and capture a sound/voice on the voice attributes capture module 518 and the information processing, formatting, and organizing module 522. Voice recognition algorithms and/or methods may include, without limitation, Bayesian networks, fuzzy logic, neural networks, template matching, Hidden Markov models, machine learning, data mining, feature extraction and data analysis/statistics, optical character recognition, etc. In some alternative embodiments of the present invention, a binary search tree may be implemented to extract data from a voice.

It may be appreciated by a person with ordinary skill in the art, in light of and in accordance with the teachings of the present invention, that virtually any algorithm and/or computer code may be used to recognize and capture mental and physical state of a user on the mental attributes capture module 520 and the information processing, formatting, and organizing module 522. Mental state analysis recognition algorithms and/or methods may include, without limitation may be variety of questionnaires regarding the intellect (IQ), psychological make-up, and physical make-up of the user. The aforementioned questionnaires may be found online as a program for specific applications leading to a mental and physical analysis.

It may be appreciated by a person with ordinary skill in the art, in light of and in accordance with the teachings of the present invention, that there may be a plurality of the same modules in architecture 500. A plurality of modules such as, without limitation, includes a visual attributes capture module 516, a voice attributes capture module 518, a mental attributes capture module 520, an information processing, formatting, and organizing module 522, a digital virtual clone generation module 524, a database 526, a display module 528, an organized user information storage module 530, an interactive simulated environment generation module 532, an integration module 534, an interface module 536, and an interactive display of digital virtual clone in simulated environment module 538 may be present in architecture 500. The plurality of similar modules may work in parallel or independently to improve the throughput and/or speed of architecture 500. In alternative embodiments of the present invention, a plurality of capture, processing, formatting, and organizing, generation, display, integration, interface, and storage modules may be connected to a system via wired and wireless connections to access resources from different wired and wireless networks. In still other alternative embodiments of the present invention, a plurality of similar modules may form a secondary system capable of seamlessly substituting an errant module.

It may be appreciated by a person with ordinary skill in the art, in light of and in accordance with the teachings of the present invention, that any module in architecture 500 may perform data manipulation. Data manipulation such as, but not limited to, compression, encryption, formatting. In some alternative embodiments of the present invention, any module sending data may first compress the data prior to data transmission.

It may be appreciated by a person with ordinary skill in the art, in light of and in accordance with the teachings of the present invention, that the completion of the aforementioned procedures may provide the user with a unique opportunity and a unique form of entertainment to view a virtual version of himself/herself acting in the movie among professional and famous actors. Ordinary people may never experience such situations in real life, but here they may have the opportunity to see themselves interacting with celebrity actors. Moreover the digital virtual clone may enable the user to observe, try to predict, and learn from how their digital virtual clone interacts and behaves in the different simulated scenarios.

Figure 6:
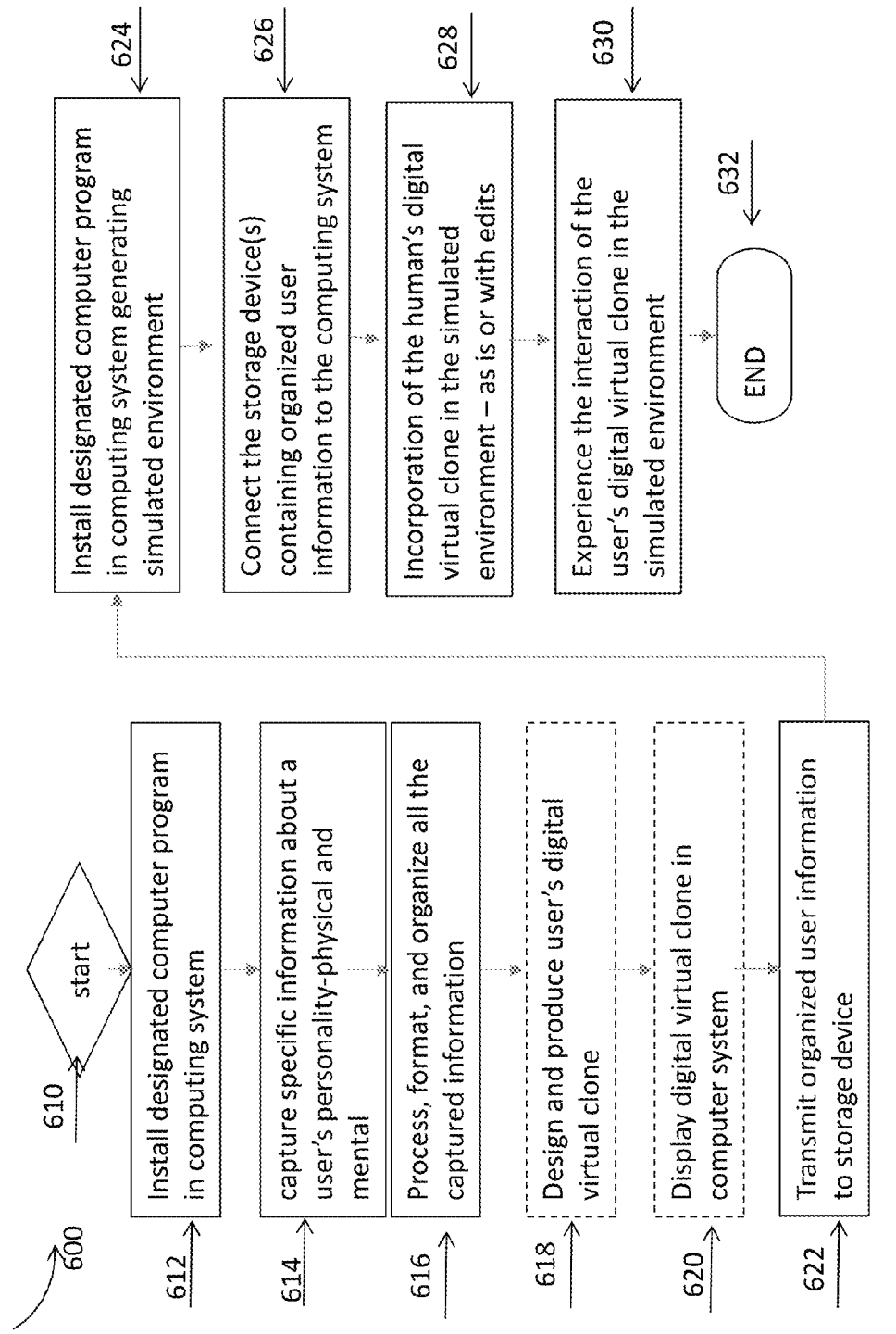
FIG. 6 is a flow chart illustrating an exemplary process for using a digital virtual clone of a user in a predesigned simulation, in accordance with an embodiment of the present invention.

FIG. 6 is a flow chart illustrating an exemplary process for using a digital virtual clone of a user in a predesigned simulated environment, in accordance with an embodiment of the present invention. Using a digital virtual clone of a user in a predesigned simulated environment may begin with a first set of steps for creating the digital virtual clone. After a start step 610 a computer program may be installed in a computing system in a step 612. The computing system in step 612 may be configured for capturing specific information about a user's personality including information on physical and mental state of a user. Specific information about a user's personality including information on physical and mental state may be captured in a step 614. Image/voice/data processing, formatting and rendering algorithms may be applied in a process, format, and render all the captured information a step 616. A digital virtual clone of the user may be designed in a step 618. If the digital virtual clone was not determined, the user may be prompted to capture correct data. The steps 614 and 616 may be repeated until the captured, processed, formatted and rendered information is sufficient to provide a satisfactory digital virtual clone of the user in step 618. The digital virtual clone may then be displayed in the computer system in a step 620. In some embodiments step 620 may be optional. The organized user information may be used for generating the digital virtual clone of the user may then be transmitted to a storage device in a transfer organized user information to a storage device step 622. In some embodiments if the displayed digital virtual clone is not satisfactory steps 614, 616, and 618 may be repeated. A designated computer program for generating a simulated environment may be installed in a computing system in a next step 624. The storage device from step 622 may then be connected to the computing system from step 624 in a step 626. The digital virtual clone may be incorporated in the simulated environment program in a step 628. In some embodiments, the digital virtual clone designed in step 618 may be directly incorporated into the simulated environment. In this embodiment, the user may see a digital virtual clone embodying his/her true/original characteristics interacting with situations in the simulated environment in a step 630. In other embodiments, the user may modify the features of the digital virtual clone to exhibit a different personality from the user's original personality and this modified digital virtual clone may be incorporated in a step 630. In this embodiment, the user may see a digital virtual clone embodying certain modified characteristics interacting with situations in the simulated environment. It may be appreciated by a person with ordinary skill in the art, in light of and in accordance with the teachings of the present invention, that virtually any characteristic may be added by the user and the user may judiciously use the comparison and learning in real life situations. In other embodiments, the interactive environment generation module 532 and/or the integration module 534 may adapt the simulated environment to accommodate for certain original preferences of the user without majorly departing from the original outline of the simulated environment. The user may finally end the simulation in a step 632 and restart the process. In some embodiments, the software program that may provide the digital virtual clone creation may include algorithms for modifying, adding, and/or deleting certain user characteristics. The application software may simulate the behavior of the digital virtual clone based on the analysis of the organized user information. The clone on the other hand may be the plugin program that maintains the users' information in an organized manner so as to render the program compatible with the different application software where the digital virtual clone may be incorporated. In this embodiment, the user may learn about himself/herself watching the behavior of the clone and may have a possibility of changing his/her personal behavior and hence the personal data.

It may be appreciated by a person with ordinary skill in the art, in light of and in accordance with the teachings of the present invention, that virtually any additional steps may be added to the process of designing and using the digital virtual clone 600. Additional steps may include, but not limited to, additional data gathering, sending messages to other devices, and accessing additional resources. In yet other alternative embodiments of the present invention, process of designing and using the digital virtual clone 600 may include suggesting recommended resolutions to a user before and/or after a computer program captures user information.

It may be appreciated by a person with ordinary skill in the art, in light of and in accordance with the teachings of the present invention, that one or more steps in process of designing and using the digital virtual clone 600 may be added, removed, or rearranged. In other embodiments of the present invention, the order of steps in the process of designing and using the digital virtual clone 600 may occur in any order. In still other embodiments of the present invention, additional steps may be added to the process of designing and using the digital virtual clone 600.

It may be appreciated by a person with ordinary skill in the art, in light of and in accordance with the teachings of the present invention, the user may have multiple viewing selections using this system. In some embodiments, the users may watch these movies individually. In other embodiments, users may share these movies with others. Sharing enables learning from theirs and others behaviours in simulated environments. Other embodiments may include designated cinema theaters which may be facilitated with computing systems to read the storage devices containing the users' digital clones which may be transferred to the movie software to ultimately convert those clones into film characters and allow the audience to have a unique and amazing journey in the virtual film world. In this embodiment, every single user may magically turn into a virtual actor and may have a part in the plot on the big screen in the theater. In a non-limiting example, all theatre viewers in a specially designed theater, which enables transferring the virtual clones of the viewers, may watch all other viewers' digital virtual clones as movie characters on the same big screen at the same time. In exemplary non-limiting embodiments, the number of the movie tickets being sold may have to match the number of the available vacant character spots in the designated movie. In some embodiments, the number of vacant character spots may be a dozen or more spots. A variety of movie plots may be employed there, like, for example, but not limited to, "Space Shuttle Flight to Mars", "Amazonia Jungle Adventure", "Travel to Everest", etc. Upon taking a seat in the theater, each viewer may be enabled with a computing system to insert his/her individual storage device. It may take a period of time for the computing systems to render all viewers' information in the form of their independent digital virtual clones. In a theater this time may be used to air commercials or other movies' trailers. The movie stars of the original plot in such movies may be already pre-recorded, pre-loaded, and saved in the movie software. Their movie characters may be the leading characters who move the whole movie plot forward, while the viewers' clones may fill the vacant spots and act around the leading characters. This application may be a potential popular attraction among family and friends who visit cinema theaters.

Figure 7:
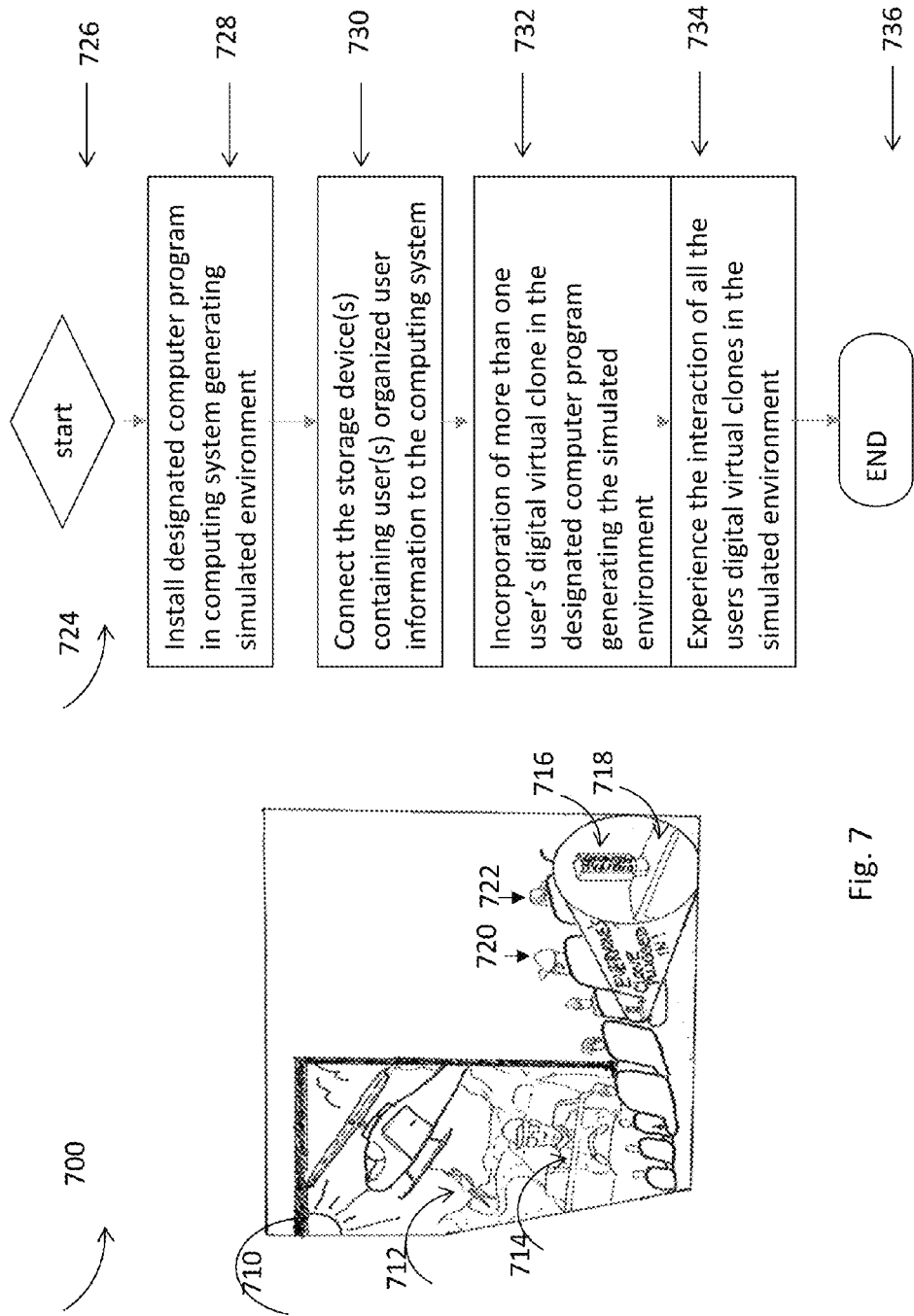
FIG. 7 illustrates an exemplary system using a digital virtual clone of a user in a predesigned simulation, in accordance with an embodiment of the present invention.

FIG. 7 illustrates an exemplary system using a digital virtual clone of more than one user in a predesigned simulation, in accordance with an embodiment of the present invention. The exemplary system 700 may be a pre-designed simulation in a movie theatre. A computer program providing the pre-designed simulation is shown on the display module 710. Digital virtual clones 712 and 714 of more than one user 720 and 722 may be incorporated in the pre-designed simulation. In this embodiment, seats 718 in the movie theater may be modified to connect to the storage device housing the organized user information for generating the digital virtual clones of the users and function as a computing system or a connect to the computing system that designs the digital virtual clone of the user as described hereinabove.

FIG. 7A is a flow chart 724 illustrating an exemplary process for using a digital virtual clone of a user in a predesigned simulation, in accordance with an embodiment of the present invention. The exemplary process starts with a step 726. A computer program for generating a simulated environment may be installed in a computing system in a step 728. More than one storage devices independently comprising the organized user information for generating the digital virtual clone of more than one user may be connected to the computing system in a step 730. The digital virtual clones may be incorporated in the simulated environment program generated by the designated computer program in a step 732. The user may experience the interaction of all the users' digital virtual clones in a simulation environment in a step 734. In some embodiments, the digital virtual clone may be directly incorporated into the simulated environment without any changes to the organized user information. In these embodiments, the user experiences a digital virtual clone embodying his/her true characteristics interacting with situations in the simulated environment in a step 732. In other embodiments, a user or multiple users may modify the features of their digital virtual clone to exhibit a different personality from the user's original personality and this modified digital virtual clone may be incorporated in a step 732. In these embodiments, the user experiences a digital virtual clone embodying certain modified characteristics interacting with situations in the simulated environment. It may be appreciated by a person with ordinary skill in the art, in light of and in accordance with the teachings of the present invention, that virtually any characteristic may be added by the user and the user may judiciously use the comparison and learning in real life situations. In other embodiments, the interactive environment generation module and/or the integration module may adapt the simulated environment to accommodate for some original preferences of the user without majorly departing from the original outline of the simulated environment. The user may finally end the simulation in a step 736 and restart the process.

It may be appreciated by a person with ordinary skill in the art, in light of and in accordance with the teachings of the present invention, that virtually any additional steps may be added to the process of using the digital virtual clone 724. Additional steps may include, but not limited to, additional data gathering, sending messages to other devices, and accessing additional resources. In yet other alternative embodiments of the present invention, process of using the digital virtual clone 724 may include suggesting recommended resolutions to a user before and/or after a computer program captures user information.

It may be appreciated by a person with ordinary skill in the art, in light of and in accordance with the teachings of the present invention, that one or more steps in process of using the digital virtual clone 724 may be added, removed, or rearranged. In other embodiments of the present invention, the order of steps in the process of using the digital virtual clone 724 may occur in any order. In still other embodiments of the present invention, additional steps may be added to the process of using the digital virtual clone 724.

It may be appreciated by a person with ordinary skill in the art, in light of and in accordance with the teachings of the present invention, the digital virtual clone described herein may have other potential applications in the industry.

Figure 8:
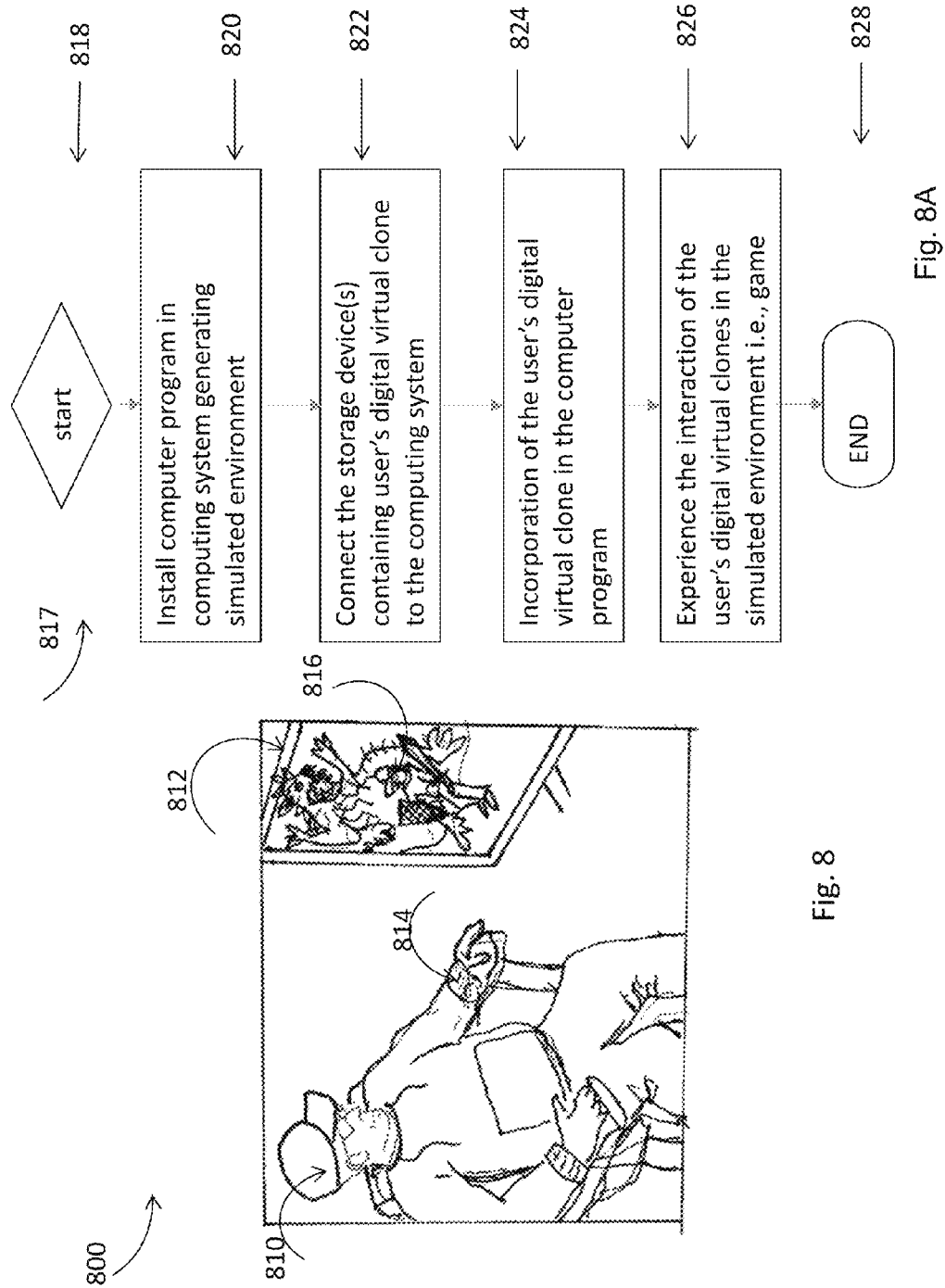
FIG. 8 illustrates an exemplary system using a digital virtual clone of a user in a predesigned simulation, in accordance with an embodiment of the present invention.

FIG. 8 illustrates an exemplary system using a digital virtual clone of a user in a predesigned simulation, in accordance with an embodiment of the present invention. In some embodiments, the digital virtual clone may be employed in a gaming industry. In the present embodiment, the exemplary system 800 may be a pre-designed simulation in a game display screen 812. One or more users 810 may connect 814 to the pre-designed simulation with the storage devices containing their organized user information for generating digital virtual clones of the users. It may be appreciated by a person with ordinary skill in the art, in light of and in accordance with the teachings of the present invention, this results in the incorporation of the user's digital virtual clone which may be supposed to bear a resemblance to the user's appearance and personality as well as the user's mental and physical states in a simulated environment 816, in this case the game. In some embodiments, the digital virtual clone of the user may be enabled to take part in the simulated environment in the "first person". The user may be no longer controlling a virtual character on screen in the "third person". In some embodiments, the digital virtual clone transferred to the game may include the original organized user information from the storage device without any edits to the information. Accordingly, all of the necessary variables for game may originate from the user's recorded personal data base 221, 526, and the user's digital virtual clone may be generated. The number of gaming variables may be noticeably increased. Thus, these variables may have a straight association with real human beings (users) instead of with inanimate videogame characters. As mentioned hereinabove, the digital virtual clone of a user embodies the physical and mental state of a user including, but not limited to, his/her strength, weakness, human feelings and features, such as, without limitation, curiosity, kindness, ambition, patience, fear, envy, anger, arrogance, etc. In various embodiments, the user may be enabled to manipulate the physical and mental state of the digital virtual clone. Thus the user's physical and mental state may impact the outcome of the simulated environment. In a non-limiting example, information on the user's physical power may impact the actions or outcome of his/her clone in a simulated environment. In some embodiments, the video game plot may remain constant. The digital virtual clone's reactions to the different circumstances may vary. The digital virtual clone experiences the computing system based simulation of a variety of real and unreal environments where the user may be immersed via his/her individual digital virtual clone.

It may be appreciated by a person with ordinary skill in the art, in light of and in accordance with the teachings of the present invention, the proposed gaming method may insert a gamer (user) straight into a game's surroundings, and give the gamer the exclusive opportunity to continue being himself/herself in the game's surroundings. As the gaming character may be dramatically humanized, the user may experience complex emotional feelings watching his/her virtual clone's gaming adventures. With this digital virtual clone gaming system and method, the significance of a game's impact on gamers may no longer be just about having fun or winding down. There may be an increased focus on self-learning, self-testing, and self-assessment, all features that may increase feelings of attachment in gamers to their digital virtual clones and digital virtual worlds. Through their digital twin, users may be able to learn quite a lot of new things about themselves, and may even find the answers to life's main questions: Who am I?, What is my value?, How am I different from others?, etc.

In various embodiments, the gaming concept disclosed herein may be implemented in several ways including but not limited to a Digital Memory plugin for a traditional game, as a simulation for personal use, and as a standalone videogame.

In some embodiments, the digital virtual clone has features representing the user. In other embodiments, the user may modify/edit the digital virtual clone to have features different from their physical and emotional benchmark. The simulated environment may incorporate the edited digital virtual clone and demonstrate how the user may behave and react to situations in real life as if the user actually has the modified traits.

FIG. 8A is a flow chart 817 illustrating an exemplary process for using a digital virtual clone of a user in a predesigned simulation, in accordance with an embodiment of the present invention. The exemplary process starts with a step 818. A computer program for generating a simulated environment may be installed in a computing system in a step 820. A storage device comprising the organized user information for generating the digital virtual clone of the user may be connected to the computing system in a step 822. The digital virtual clone may be incorporated in the simulated environment program generated by the designated computer program in a step 824. In this example where the simulated environment may be a game, in some embodiments, no changes may be made to the original user characteristics while generating the digital virtual clone of the user. The user may experience his/her interaction with the simulated environment in a step 826. In some embodiments, the digital virtual clone may be directly incorporated into the simulated environment without any changes to the organized user information. In these embodiments, the user may experience a digital virtual clone embodying his/her true characteristics interacting with situations in the simulated environment in a step 826. The user may finally end the simulation in a step 828 and restart the process.

It may be appreciated by a person with ordinary skill in the art, in light of and in accordance with the teachings of the present invention, that virtually any additional steps may be added to the process of using the digital virtual clone 817. Additional steps may include, but not limited to, additional data gathering, sending messages to other devices, and accessing additional resources. In yet other alternative embodiments of the present invention, process of using the digital virtual clone 817 may include suggesting recommended resolutions to a user before and/or after a computer program captures user information.

It may be appreciated by a person with ordinary skill in the art, in light of and in accordance with the teachings of the present invention, that one or more steps in process of using the digital virtual clone 817 may be added, removed, or rearranged. In other embodiments of the present invention, the order of steps in the process of using the digital virtual clone 817 may occur in any order. In still other embodiments of the present invention, additional steps may be added to the process of using the digital virtual clone 817.

It may be appreciated by a person with ordinary skill in the art, in light of and in accordance with the teachings of the present invention, the digital virtual clone described herein may have other potential applications in the industry. In some embodiments, the digital virtual clone may be employed in a job search market. The organized user information for generating the digital virtual clone may be sent in lieu of resumes and cover letters. In some embodiments, organized user information for generating the digital virtual clone may be sent electronically to the company looking to hire. In some embodiments, a storage device containing the organized user information for generating the digital virtual clone may be sent to the company looking to hire. The potential employer may have a designated computer program related to the particular job position which will be able to analyze the user's digital virtual clone and evaluate the user's potential for being hired. In these exemplary embodiments, the user's—i.e., the job searcher's digital virtual clone may be reinforced by number of specific tests conducted and verified by professional specialists, like psychologists, in order to build up a complete representation of the job candidate. The hiring method may find especially important implications for professions seeking individuals with specific personalities, for example, without limitation, firefighters, police, rescue teams, soldiers, pilots etc.

Figure 9:
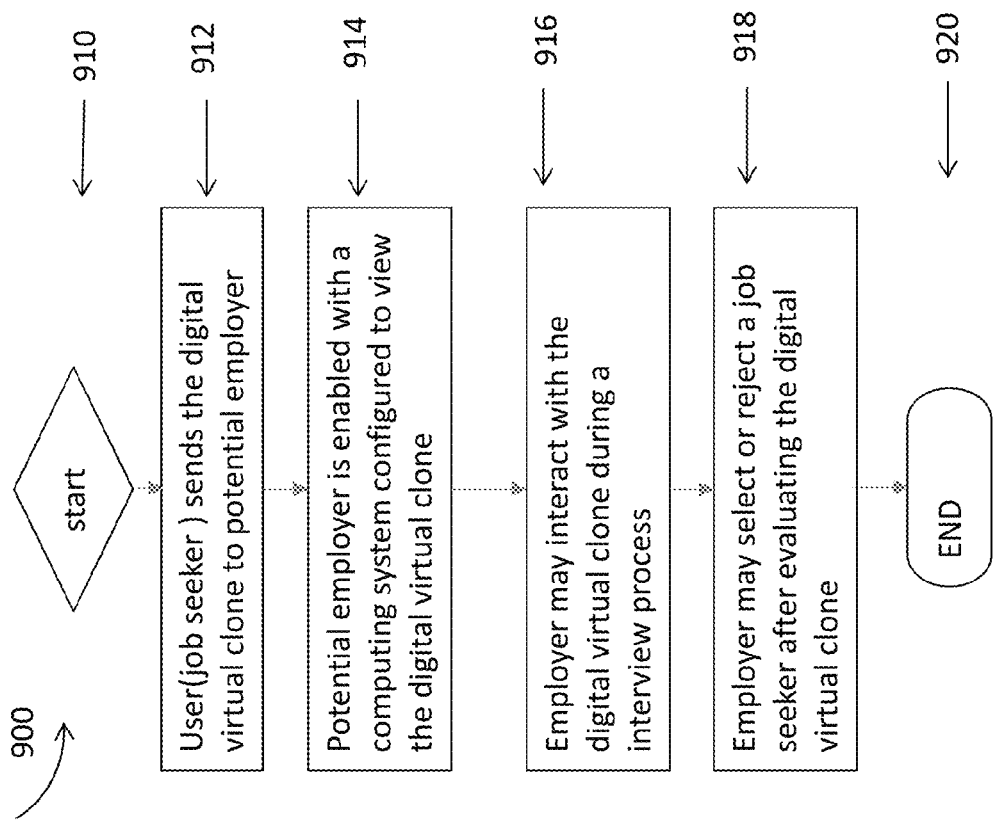
FIG. 9 is a flow chart illustrating an exemplary process for using a digital virtual clone of a user in a predesigned simulation, in accordance with an embodiment of the present invention.

FIG. 9 is a flow chart illustrating an exemplary process for using a digital virtual clone of a user in a predesigned simulation, in accordance with an embodiment of the present invention. The process starts at a step 910. A user (job seeker) sends his/her organized user information for generating the digital virtual clone to a potential employer in a step 912. As described herein above, the digital virtual clone may include the physical and mental attributes of the user. In various embodiments, the digital virtual clone may also include features generated by the professional evaluation of the users, for example, without limitation, a psychological evaluation. The potential employer may be enabled with a computing system configured to view the digital virtual clone in a step 914. The employer may view the digital virtual clone using the computing system. The employer in a step 916 may also conduct an interview of the digital virtual clone to better understand the user. The employer may select or reject a job seeker after evaluating the digital virtual clone in a step 918. The process ends at a step 920 and the job seeker may restart the process. It may be appreciated by a person with ordinary skill in the art, in light of and in accordance with the teachings of the present invention, that virtually any characteristic may be added by the user and the user may judiciously use the comparison and learning in real life situations.

It may be appreciated by a person with ordinary skill in the art, in light of and in accordance with the teachings of the present invention, that virtually any additional steps may be added to the process of using the digital virtual clone 900. Additional steps may include, but not limited to, additional data gathering, sending messages to other devices, and accessing additional resources. In yet other alternative embodiments of the present invention, process of using the digital virtual clone 900 may include suggesting recommended resolutions to a user before and/or after a computer program captures user information.

It may be appreciated by a person with ordinary skill in the art, in light of and in accordance with the teachings of the present invention, that one or more steps in process of using the digital virtual clone 900 may be added, removed, or rearranged. In other embodiments of the present invention, the order of steps in the process of using the digital virtual clone 900 may occur in any order. In still other embodiments of the present invention, additional steps may be added to the process of using the digital virtual clone 900.

In other embodiments, the digital virtual clone may be used in the online social dating scenario to help people find a prospective partner in an easier, more reliable way. In these embodiments, the system and process employed may be similar to that of the job search market application. The users may send their organized user information for generating the digital virtual clone data to a social dating agency. The agency may have a special computer program enabled to analyze the user's digital virtual clone and attempt to locate a digital virtual clone of another person with a profile matching that of the user form the agency database. It may be appreciated by a person with ordinary skill in the art, in light of and in accordance with the teachings of the present invention, that with designated software the users may organize a "preliminary date" for their digital virtual clones to interact and the users may watch and evaluate the preliminary date event. The users may thus be prepared for the actual dating event if and when planned.

In yet other embodiments, the digital virtual clone may be used in online social networking industry. The most attractive part of existing social networks seems to be the opportunity for individuals to have a mode through which they can share resources, knowledge, and meet potential friends and acquaintances. Users enjoy sharing a variety of media, including personal information, with other users. Yet, all users realize that even though this way of communicating may be a great modern tool to get in touch with friends and others, it may be actually just a virtual substitution for face-to-face conversation. The system and method disclosed herein may include a specially designed software program that may transform virtual social networking bringing it closer to reality. The software program may share the principles presented herein to incorporate the digital virtual clones of the users into a computing system enabled with an animation software program designed for social networking. In some embodiments, the user may be able to set up virtual online meetings or parties for their digital virtual clones using the computing system. The users may send their virtual representative to hold a meeting with other virtual friends or loved ones. The meeting or party may simulate plausible real events via digital virtual clone interaction; the digital virtual clones may gather, introduce themselves, chat with each other face to face (virtually), present their pictures and videos, sharing their thoughts, plans and ideas, and even make jokes. Their living counterparts, the users, may enjoy watching these spontaneous and interesting events being conducted in social networking spaces at their convenience.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

Figure 10:
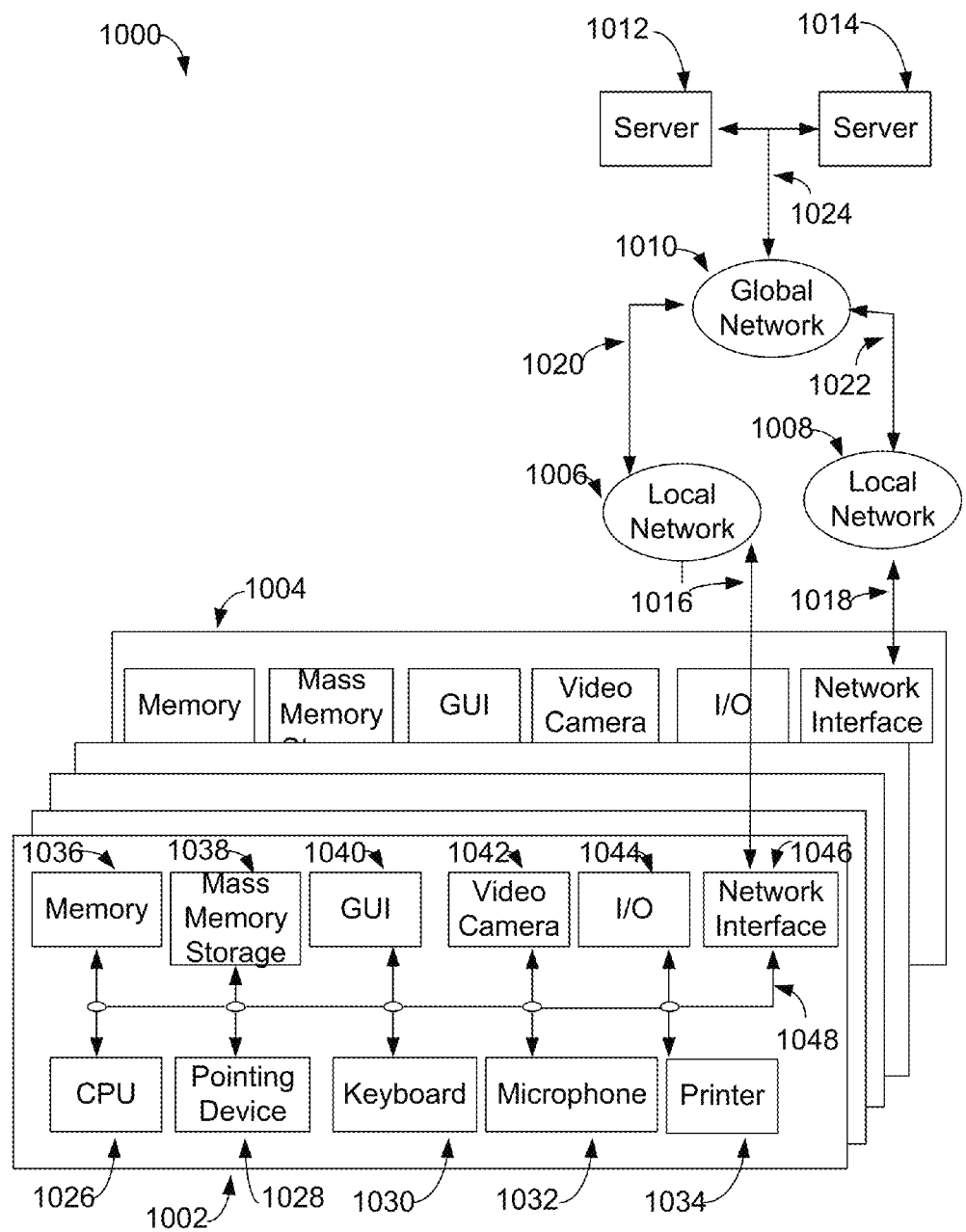
FIG. 10 is a block diagram depicting an exemplary client/server system which may be used by an exemplary web-enabled/networked embodiment of the present invention.

FIG. 10 is a block diagram depicting an exemplary client/server system which may be used by an exemplary web-enabled/networked embodiment of the present invention.

A communication system 1000 includes a multiplicity of clients with a sampling of clients denoted as a client 1002 and a client 1004, a multiplicity of local networks with a sampling of networks denoted as a local network 1006 and a local network 1008, a global network 1010 and a multiplicity of servers with a sampling of servers denoted as a server 1012 and a server 1014.

Client 1002 may communicate bi-directionally with local network 1006 via a communication channel 1016. Client 1004 may communicate bi-directionally with local network 1008 via a communication channel 1018. Local network 1006 may communicate bi-directionally with global network 1010 via a communication channel 1020. Local network 1008 may communicate bi-directionally with global network 1010 via a communication channel 1022. Global network 1010 may communicate bi-directionally with server 1012 and server 1014 via a communication channel 1024. Server 1012 and server 1014 may communicate bi-directionally with each other via communication channel 1024. Furthermore, clients 1002, 1004, local networks 1006, 1008, global network 1010 and servers 1012, 1014 may each communicate bi-directionally with each other.

In one embodiment, global network 1010 may operate as the Internet. It will be understood by those skilled in the art that communication system 1000 may take many different forms. Non-limiting examples of forms for communication system 1000 include local area networks (LANs), wide area networks (WANs), wired telephone networks, wireless networks, or any other network supporting data communication between respective entities.

Clients 1002 and 1004 may take many different forms. Non-limiting examples of clients 1002 and 1004 include personal computers, personal digital assistants (PDAs), cellular phones and smartphones.

Client 1002 includes a CPU 1026, a pointing device 1028, a keyboard 1030, a microphone 1032, a printer 1034, a memory 1036, a mass memory storage 1038, a GUI 1040, a video camera 1042, an input/output interface 1044, and a network interface 1046.

CPU 1026, pointing device 1028, keyboard 1030, microphone 1032, printer 1034, memory 1036, mass memory storage 1038, GUI 1040, video camera 1042, input/output interface 1044 and network interface 1046 may communicate in a unidirectional manner or a bi-directional manner with each other via a communication channel 1048. Communication channel 1048 may be configured as a single communication channel or a multiplicity of communication channels.

CPU 1026 may be comprised of a single processor or multiple processors. CPU 1026 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors.

As is well known in the art, memory 1036 is used typically to transfer data and instructions to CPU 1026 in a bi-directional manner. Memory 1036, as discussed previously, may include any suitable computer-readable media, intended for data storage, such as those described above excluding any wired or wireless transmissions unless specifically noted. Mass memory storage 1038 may also be coupled bi-directionally to CPU 1026 and provides additional data storage capacity and may include any of the computer-readable media described above. Mass memory storage 1038 may be used to store programs, data and the like and is typically a secondary storage medium such as a hard disk. It will be appreciated that the information retained within mass memory storage 1038, may, in appropriate cases, be incorporated in standard fashion as part of memory 1036 as virtual memory.

CPU 1026 may be coupled to GUI 1040. GUI 1040 enables a user to view the operation of computer operating system and software. CPU 1026 may be coupled to pointing device 1028. Non-limiting examples of pointing device 1028 include computer mouse, trackball and touchpad. Pointing device 1028 enables a user with the capability to maneuver a computer cursor about the viewing area of GUI 1040 and select areas or features in the viewing area of GUI 1040. CPU 1026 may be coupled to keyboard 1030. Keyboard 1030 enables a user with the capability to input alphanumeric textual information to CPU 1026. CPU 1026 may be coupled to microphone 1032. Microphone 1032 enables audio produced by a user to be recorded, processed and communicated by CPU 1026. CPU 1026 may be connected to printer 1034. Printer 1034 enables a user with the capability to print information to a sheet of paper. CPU 1026 may be connected to video camera 1042. Video camera 1042 enables video produced or captured by user to be recorded, processed and communicated by CPU 1026.

CPU 1026 may also be coupled to input/output interface 1044 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 1026 optionally may be coupled to network interface 1046 which enables communication with an external device such as a database or a computer or telecommunications or internet network using an external connection shown generally as communication channel 1016, which may be implemented as a hardwired or wireless communications link using suitable conventional technologies. With such a connection, CPU 1026 might receive information from the network, or might output information to a network in the course of performing the method steps described in the teachings of the present invention.

Figure 11:
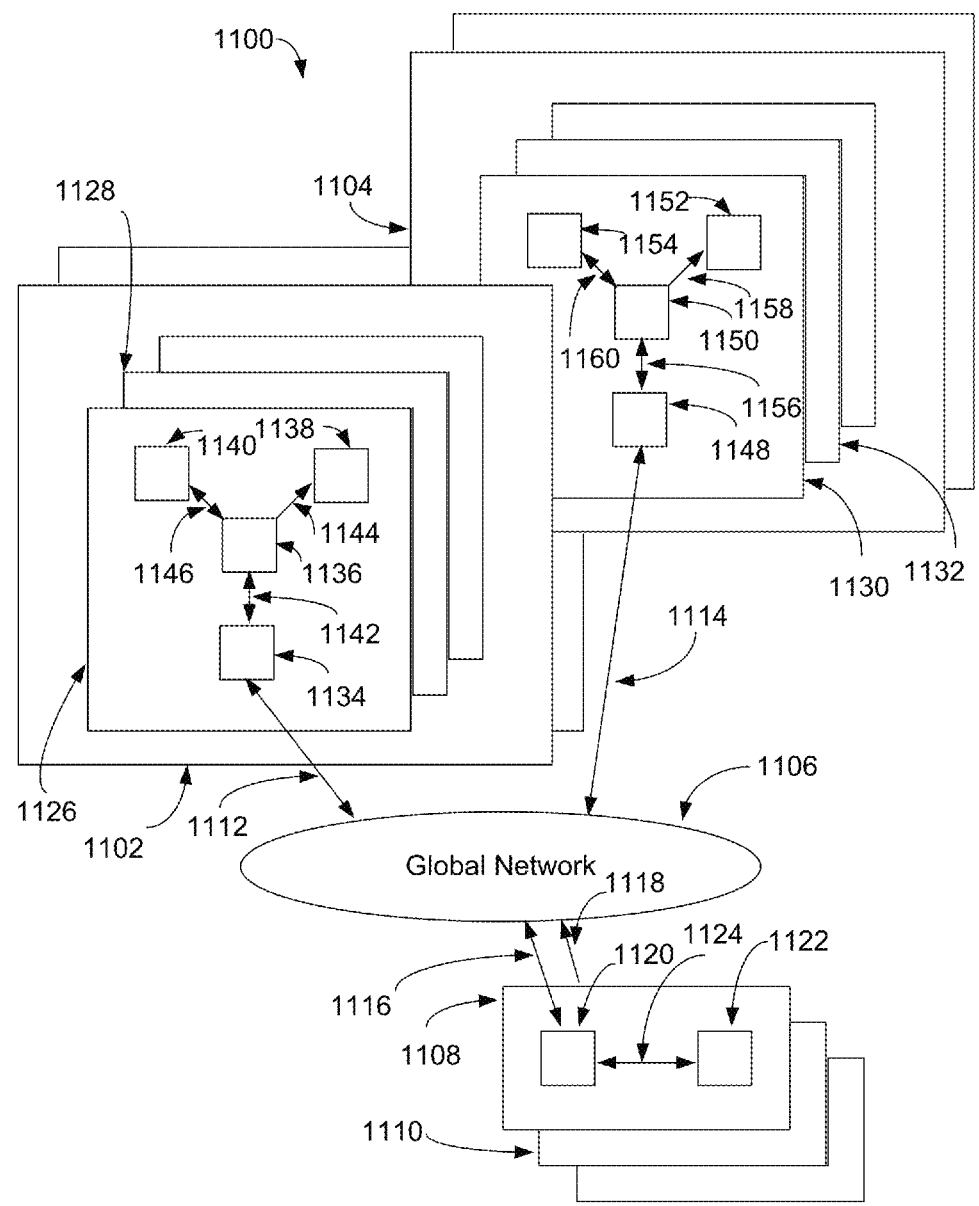
FIG. 11 illustrates a block diagram depicting a conventional client/server communication system.

FIG. 11 illustrates a block diagram depicting a conventional client/server communication system.

A communication system 1100 includes a multiplicity of networked regions with a sampling of regions denoted as a network region 1102 and a network region 1104, a global network 1106 and a multiplicity of servers with a sampling of servers denoted as a server device 1108 and a server device 1110.

Network region 1102 and network region 1104 may operate to represent a network contained within a geographical area or region. Non-limiting examples of representations for the geographical areas for the networked regions may include postal zip codes, telephone area codes, states, counties, cities and countries. Elements within network region 1102 and 1104 may operate to communicate with external elements within other networked regions or within elements contained within the same network region.

In some implementations, global network 1106 may operate as the Internet. It will be understood by those skilled in the art that communication system 1100 may take many different forms. Non-limiting examples of forms for communication system 1100 include local area networks (LANs), wide area networks (WANs), wired telephone networks, cellular telephone networks or any other network supporting data communication between respective entities via hardwired or wireless communication networks. Global network 1106 may operate to transfer information between the various networked elements.

Server device 1108 and server device 1110 may operate to execute software instructions, store information, support database operations and communicate with other networked elements. Non-limiting examples of software and scripting languages which may be executed on server device 1108 and server device 1110 include C, C++, C# and Java.

Network region 1102 may operate to communicate bi-directionally with global network 1106 via a communication channel 1112. Network region 1104 may operate to communicate bi-directionally with global network 1106 via a communication channel 1114. Server device 1108 may operate to communicate bi-directionally with global network 1106 via a communication channel 1116. Server device 1110 may operate to communicate bi-directionally with global network 1106 via a communication channel 1118. Network region 1102 and 1104, global network 1106 and server devices 1108 and 1110 may operate to communicate with each other and with every other networked device located within communication system 1100.

Server device 1108 includes a networking device 1120 and a server 1122. Networking device 1120 may operate to communicate bi-directionally with global network 1106 via communication channel 1116 and with server 1122 via a communication channel 1124. Server 1122 may operate to execute software instructions and store information.

Network region 1102 includes a multiplicity of clients with a sampling denoted as a client 1126 and a client 1128. Client 1126 includes a networking device 1134, a processor 1136, a GUI 1138 and an interface device 1140. Non-limiting examples of devices for GUI 1138 include monitors, televisions, cellular telephones, smartphones and PDAs (Personal Digital Assistants). Non-limiting examples of interface device 1140 include pointing device, mouse, trackball, scanner and printer. Networking device 1134 may communicate bi-directionally with global network 1106 via communication channel 1112 and with processor 1136 via a communication channel 1142. GUI 1138 may receive information from processor 1136 via a communication channel 1144 for presentation to a user for viewing. Interface device 1140 may operate to send control information to processor 1136 and to receive information from processor 1136 via a communication channel 1146. Network region 1104 includes a multiplicity of clients with a sampling denoted as a client 1130 and a client 1132. Client 1130 includes a networking device 1148, a processor 1150, a GUI 1152 and an interface device 1154. Non-limiting examples of devices for GUI 1138 include monitors, televisions, cellular telephones, smartphones and PDAs (Personal Digital Assistants). Non-limiting examples of interface device 1140 include pointing devices, mousse, trackballs, scanners and printers. Networking device 1148 may communicate bi-directionally with global network 1106 via communication channel 1114 and with processor 1150 via a communication channel 1156. GUI 1152 may receive information from processor 1150 via a communication channel 1158 for presentation to a user for viewing. Interface device 1154 may operate to send control information to processor 1150 and to receive information from processor 1150 via a communication channel 1160.

For example, consider the case where a user interfacing with client 1126 may want to execute a networked application. A user may enter the IP (Internet Protocol) address for the networked application using interface device 1140. The IP address information may be communicated to processor 1136 via communication channel 1146. Processor 1136 may then communicate the IP address information to networking device 1134 via communication channel 1142. Networking device 1134 may then communicate the IP address information to global network 1106 via communication channel 1112. Global network 1106 may then communicate the IP address information to networking device 1120 of server device 1108 via communication channel 1116. Networking device 1120 may then communicate the IP address information to server 1122 via communication channel 1124. Server 1122 may receive the IP address information and after processing the IP address information may communicate return information to networking device 1120 via communication channel 1124. Networking device 1120 may communicate the return information to global network 1106 via communication channel 1116. Global network 1106 may communicate the return information to networking device 1134 via communication channel 1112. Networking device 1134 may communicate the return information to processor 1136 via communication channel 1142. Processor 1146 may communicate the return information to GUI 1138 via communication channel 1144. User may then view the return information on GUI 1138.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention. Depending upon the needs of the particular application, it will be readily apparent to those skilled in the art, in light of the teachings of the present invention, which aspects of the present invention can or should be located locally and which can or should be located remotely. Thus, for any claims construction of the following claim limitations that are construed under 35 USC § 112 (6) it is intended that the corresponding means for and/or steps for carrying out the claimed function are the ones that are locally implemented within the jurisdiction of the USA, while the remaining aspect(s) performed or located remotely outside the USA are not intended to be construed under 35 USC § 112 (6).

It is noted that according to USA law, all claims must be set forth as a coherent, cooperating set of limitations that work in functional combination to achieve a useful result as a whole. Accordingly, for any claim having functional limitations interpreted under 35 USC § 112 (6) where the embodiment in question is implemented as a client-server system with a remote server located outside of the USA, each such recited function is intended to mean the function of combining, in a logical manner, the information of that claim limitation with at least one other limitation of the claim. For example, in client-server systems where certain information claimed under 35 USC § 112 (6) is/(are) dependent on one or more remote servers located outside the USA, it is intended that each such recited function under 35 USC § 112 (6) is to be interpreted as the function of the local system receiving the remotely generated information required by a locally implemented claim limitation, wherein the structures and or steps which enable, and breath life into the expression of such functions claimed under 35 USC § 112 (6) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present application, and "35 USC § 112 (6)" should be replaced with the closest corresponding statute in the patent laws of such pertinent country or countries or legal organization(s).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112 (6) when such corresponding structures are not explicitly disclosed in the foregoing patent specification. Therefore, for any invention element(s)/structure(s) corresponding to functional claim limitation(s), in the below claims interpreted under 35 USC § 112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing the design and use of digital virtual clones in simulated environments using designated computer programs according to the present invention will be apparent to those skilled in the art. Various aspects of the invention have been described above by way of illustration, and the specific embodiments disclosed are not intended to limit the invention to the particular forms disclosed. The particular implementation of the design and use of digital virtual clones in simulated environments using designated computer programs may vary depending upon the particular context or application. By way of example, and not limitation, the design and use of digital virtual clones in simulated environments using designated computer programs described in the foregoing were principally directed to digital virtual clones that learn about a user and effectively function on behalf of a user in implementations of simulated environments like a movie, a game, etc.; however, similar techniques may instead be applied to a job search portal, social networking, social dating, medical diagnostics, clone competitive leaderboards (e.g. virtual Olympics, other games/activities); relationship matchmaking; scientific virtual experiments (e.g. flight to Mars); creation of clone actors' database for various media; using clones from database for business surveys, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

What is claimed is:

1. A system comprising:
a first computing system at least being configured for:
interacting with a user and at least capturing physical and mental attributes of the user;
processing, formatting, and organizing captured information of the user to provide organized user information;
designing a virtual clone of the user using at least the organized user information; and
producing a digital virtual clone of the user;
a storage device at least being configured for storing the organized user information of the user; and
a second computing system at least being configured for:
generating and displaying a simulated environment the simulated environment comprising at least one empty spot, the empty spot being configured for interaction with the simulated environment;
inserting the digital virtual clone into the empty spot;
connecting to the storage device for transferring the organized user information; and
integrating the organized user information and displaying the digital virtual clone of the user in the simulated environment, wherein the digital virtual clone is at least being configured for interacting with the simulated environment.

2. The system as recited in claim 1, in which said first computing system and said second computing system each further comprises a designated software program for generating the digital virtual clone of the user using the organized user information.

3. The system as recited in claim 1, in which the simulated environment comprises a motion picture.

4. The system as recited in claim 1, in which the simulated environment comprises a job search portal.

5. The system as recited in claim 1, in which the simulated environment comprises a gaming program.

6. The system as recited in claim 1, in which the physical attributes are captured by direct interaction with the user.

7. The system as recited in claim 1, in which the physical attributes are captured using a visual recording of the user.

8. The system as recited in claim 1, in which the mental attributes are captured using a series of interactive questionnaires.

9. A method comprising the steps of:
interacting with a user of a first computing system for at least capturing physical and mental attributes of the user using inputs of the first computing system;
processing, formatting, and organizing captured information of the user to provide organized user information;
designing a virtual clone of the user using at least the organized user information;
producing a digital virtual clone of the user;
generating a simulated environment, the simulated environment comprising at least one empty spot, the empty spot being configured for interaction with the simulated environment;
inserting the digital virtual clone into the empty spot; and
transferring the organized user information to a storage device.

10. The method as recited in claim 9, further comprising the steps of:
generating a digital virtual clone of the user from at least the organized user information; and
displaying the simulated environment with the digital virtual clone interacting with the simulated environment.

11. The method as recited in claim 10, in which the simulated environment adapts to actions of the digital virtual clone.

12. The method as recited in claim 10, in which the digital virtual clone adapts to actions of the simulated environment.

13. The method as recited in claim 10, in which the simulated environment comprises a motion picture.

14. The method as recited in claim 10, in which the simulated environment comprises a job search portal.

15. The method as recited in claim 10, in which the simulated environment comprises a gaming program.

16. The method as recited in claim 9, in which the physical attributes are captured by direct interaction with the user and using a visual recording of the user, the mental attributes are captured using a series of interactive questionnaires.

17. A non-transitory computer-readable storage medium with an executable program stored thereon, wherein the program instructs one or more processors to perform the following steps:
interacting with a user of a first computing system for at least capturing physical and mental attributes of the user using inputs of the first computing system;
processing, formatting, and organizing captured information of the user to provide organized user information;
designing a virtual clone of the user using at least the organized user information;
producing a digital virtual clone of the user;
generating a simulated environment, the simulated environment comprising at least one empty spot, the empty spot being configured for interaction with the simulated environment;
inserting the digital virtual clone into the empty slot; and
transferring the organized user information to a storage device.

18. The program instructing the one or more processors as recited in claim 17, further comprising the steps of:
generating a digital virtual clone of the user from at least the organized user information; and
displaying the simulated environment with the digital virtual clone interacting with the simulated environment.

19. The program instructing the one or more processors as recited in claim 18, in which the simulated environment adapts to actions of the digital virtual clone.

20. The program instructing the one or more processors as recited in claim 18, in which the digital virtual clone adapts to actions of the simulated environment.

21. The program instructing the one or more processors as recited in claim 17, in which the physical attributes are captured by direct interaction with the user and using a visual recording of the user, the mental attributes are captured using a series of interactive questionnaires.

* * * * *